US012562874B2

(12) United States Patent
Krajnc et al.

(10) Patent No.: US 12,562,874 B2
(45) Date of Patent: Feb. 24, 2026

(54) SINGLE- AND MULTI-CHANNEL RADIO FREQUENCY BASED SENSING

(71) Applicant: SIGNIFY HOLDING B.V., Eindhoven (NL)

(72) Inventors: Hugo José Krajnc, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 280 days.

(21) Appl. No.: 18/026,165

(22) PCT Filed: Sep. 7, 2021

(86) PCT No.: PCT/EP2021/074563
§ 371 (c)(1),
(2) Date: Mar. 14, 2023

(87) PCT Pub. No.: WO2022/053454
PCT Pub. Date: Mar. 17, 2022

(65) Prior Publication Data
US 2023/0370234 A1 Nov. 16, 2023

Related U.S. Application Data

(60) Provisional application No. 63/077,897, filed on Sep. 14, 2020.

(30) Foreign Application Priority Data

Sep. 21, 2020 (EP) .................................... 20197120

(51) Int. Cl.
*H04L 5/00* (2006.01)
*H04W 48/18* (2009.01)
(Continued)

(52) U.S. Cl.
CPC ........... *H04L 5/0073* (2013.01); *H04W 48/18* (2013.01); *H04W 74/0816* (2013.01); *H05B 47/19* (2020.01)

(58) Field of Classification Search
CPC ..... H04L 5/003; H04L 5/0058; H04L 5/0073; H04L 1/0039; H04L 27/2659;
(Continued)

(56) References Cited

U.S. PATENT DOCUMENTS

| | | | | |
|---|---|---|---|---|
| 5,012,492 A | * | 4/1991 | Sexton | .................. H04L 27/148 |
| | | | | 375/328 |
| 2003/0002597 A1 | * | 1/2003 | Talwalkar | ........... H04L 27/0014 |
| | | | | 375/365 |

(Continued)

FOREIGN PATENT DOCUMENTS

| | | | | |
|---|---|---|---|---|
| CN | 110176982 | * | 8/2019 | ............... H04L 7/00 |
| CN | 111525934 | * | 8/2020 | ............... H04B 1/04 |

(Continued)

OTHER PUBLICATIONS

Shah, Syed Aziz, et al., "RF Sensing Technologies for Assisted Daily Living in Healthcare: a Comprehensive Review," IEEE A&E Systems Magazine, Nov. 2019 (19 Pages).
(Continued)

*Primary Examiner* — Warner Wong

(57) ABSTRACT

The present invention relates to performing radio frequency (RF)-based sensing. RF-based sensing is performed by a single-channel communication technology in order to detect a sensing event. Upon detecting the sensing event, a multi-channel communication technology is selected in dependence of the single-channel communication technology used for detecting the sensing event. RF-based sensing is then performed based on the multi-channel communication technology. This allows to first perform a coarse detection of a sensing event using the single-channel communication tech-
(Continued)

nology and orchestrate a subsequent RF-based sensing using the multi-channel communication technology in order to improve accuracy of the RF-based sensing. The frequency channels (412) used by the multi-channel communication technology can be selected in dependence of the frequency channel (402) used by the single-channel communication technology in order to improve the RF-based sensing, e.g., by maximizing or minimizing an overlap between the frequency channels (402, 412).

14 Claims, 7 Drawing Sheets

(51) Int. Cl.
  *H04W 74/0816*        (2024.01)
  *H05B 47/19*          (2020.01)
(58) Field of Classification Search
  CPC .............. H04L 27/266; H04L 27/2663; H04L 27/2665; H04W 48/00; H04W 48/18; H04W 74/00; H04W 74/08; H04W 74/0808; H04W 74/0846; H04W 12/009
  See application file for complete search history.

(56) References Cited

U.S. PATENT DOCUMENTS

| | | | | |
|---|---|---|---|---|
| 2007/0091720 A1* | 4/2007 | Woo | ................... | H04L 27/0004 |
| | | | | 367/39 |
| 2007/0091998 A1* | 4/2007 | Woo | ...................... | H04B 1/406 |
| | | | | 370/320 |
| 2007/0092045 A1* | 4/2007 | Woo | ................... | H04L 27/0012 |
| | | | | 375/343 |
| 2008/0020706 A1 | 1/2008 | Payne et al. | | |
| 2011/0032915 A1* | 2/2011 | Han | ...................... | H04W 16/14 |
| | | | | 370/338 |
| 2015/0327328 A1 | 11/2015 | Novak et al. | | |
| 2018/0343589 A1* | 11/2018 | Li | ......................... | H04W 74/08 |
| 2018/0365975 A1 | 12/2018 | Xu et al. | | |
| 2022/0286213 A1 | 9/2022 | Krajnc et al. | | |

FOREIGN PATENT DOCUMENTS

| | | | | | |
|---|---|---|---|---|---|
| CN | 118784434 | * | 3/2025 | ............. | H04L 27/26 |
| WO | WO-2017107525 A1 | * | 6/2017 | .............. | H04L 5/00 |
| WO | 2020043592 A1 | | 3/2020 | | |

OTHER PUBLICATIONS

Cianca, Ernestina, et al., "Radios as Sensors," IEEE Internet of Things Journal, vol. 4, No. 2, Apr. 2017 (11 Pages).
Kaltiokallio, Ossi, et al., "Enhancing the Accuracy of Radio Tomographic Imaging Using Channel Diversity," Aalto University School of Electrial Engineering, University of Utah, Mass 2012, IEE (9 Pages).

\* cited by examiner

SINGLE- AND MULTI-CHANNEL RADIO FREQUENCY BASED SENSING

CROSS-REFERENCE TO PRIOR APPLICATIONS

This application is the U.S. National Phase application under 35 U.S.C. § 371 of International Application No. PCT/EP2021/074563, filed on Sep. 7, 2021, which claims the benefit of U.S. Provisional Patent Application No. 63/077,897, filed on Sep. 14, 2020 and European Patent Application No. 20197120.7, filed on Sep. 21, 2020. These applications are hereby incorporated by reference herein.

FIELD OF THE INVENTION

The present invention relates to a radio frequency (RF)-based sensing device for performing RF-based sensing, a connected system for performing RF-based sensing, a method for performing RF-based sensing, and a computer program product for RF-based sensing.

BACKGROUND OF THE INVENTION

WO 2020/043592 A1 shows a system for selecting one or more devices in a wireless network for transmitting, receiving and/or processing a RF signal for presence and/or location detection. The system comprises at least one processor configured to determine a suitability of each of a plurality of devices for transmitting, receiving and/or processing a RF signal for presence and/or location detection, select a subset of devices from the plurality of devices based on the suitability determined for each of the plurality of devices, and instruct at least one of the subset of devices to act as a device for transmitting, receiving and/or processing a RF signal for presence and/or location detection.

US 2015/327328 A1 discloses a method for dynamic coordination of radio resource usage in a network environment. In one aspect, a relay communication method comprises detecting, by a first wireless mobile device, sensory data associated with multiple radio channels relative to at least one radio element in a sensing area of the first wireless mobile device. If the first wireless mobile device is out of range of a wide area cellular network, a short-range wireless communication path is established with a second wireless mobile device having a wide area cellular communication connection. The sensory data is transmitted by the first wireless mobile device to the second wireless mobile device for reporting to a network element via a wide area cellular network serving the second wireless mobile device.

SUMMARY OF THE INVENTION

It can be seen as an object of the present invention to provide a RF-based sensing device for performing RF-based sensing, a connected system for performing RF-based sensing, a method for performing RF-based sensing, a computer program product for performing RF-based sensing, and a computer readable medium which allow performing RF-based sensing with improved accuracy, reduced energy consumption or both.

In a first aspect of the present invention a RF-based sensing device for performing RF-based sensing by a single-channel communication technology in order to detect a sensing event is presented. The RF-based sensing device is configured upon detecting the sensing event to select a multi-channel communication technology in dependence of the single-channel communication technology used for detecting the sensing event and to perform RF-based sensing based on the multi-channel communication technology.

Since the RF-based sensing device is configured for performing RF-based sensing by a single-channel communication technology and upon detecting the event, to select a multi-channel communication technology in dependence of the single-channel communication technology and to perform RF-based sensing based on the multi-channel communication technology, required bandwidth, energy, and calculation effort during continuously performing RF-based sensing can be lowered in comparison to performing RF-based sensing based on a multi-channel communication technology continuously. Furthermore, accuracy can be increased in comparison to performing RF-based sensing by a single-channel communication technology continuously. The inventors further recognized that simply performing RF-based sensing using two different communication technologies does not necessarily result in a better accuracy, as just blindly using rather random or externally defined frequency channel choices of the communication technologies may not have a superior performance.

The RF-based sensing device may be configured to select the multi-channel communication technology additionally in dependence of a detection result obtained by the single-channel communication technology used for detecting the sensing event. The detection result may include, for example, a confidence level or probability that the sensing event is detected. The sensing event may be considered to be detected, for example, if the confidence level is above a certain detection threshold confidence level, e.g., above 50%. If the confidence level is, for example, below a certain low detection threshold confidence level, e.g., below 70%, the multi-channel communication technology may be selected in order to verify the sensing event. If the confidence level is, for example, above the low detection threshold confidence level, the multi-channel communication technology may be selected in order to complement the detection result obtained by performing RF-based sensing by the single-channel communication technology. For example, the multi-channel communication technology may be selected in order to provide additional information. The single-channel communication technology may, for example, detect presence of a user and the multi-channel communication technology may subsequently be used for recognizing an activity of the user. Selecting the multi-channel communication technology in dependence of the single-channel communication technology used for detecting the sensing event allows a selection based on context and detection information received from the single-channel communication technology used for detecting the sensing event. Considering the context and detection information allows a coordinated choice of the multi-channel communication technology for improving the performance of the RF-based sensing.

As the multi-channel communication technology for performing RF-based sensing is selected upon detecting a possible sensing event by performing RF-based sensing by the single-channel communication technology, accuracy of the RF-based sensing of the sensing event can be improved or the sensing event detected by the single-channel communication technology can at least be verified by the multi-channel communication technology. This may allow performing fine-grained detection of sensing events, performing improved classification of sensing events, and/or increasing confidence in detected sensing events. Furthermore, depending on contextual needs, RF-based sensing based on the multi-channel communication technology may complement the RF-based sensing using the single-channel communication technology in order to provide additional information on the sensing event. RF-based sensing based on the multi-channel communication technology may also confirm the sensing event detected by RF-based sensing by the single-channel communication technology.

A communication technology is defined by a setting of communication technology parameters including a communication protocol, one or more frequency channels, a frequency channel bandwidth of the respective frequency channel, a number of streams, a stream data rate, and a modulation. Changing the setting by changing one of the communication technology parameters typically changes the communication technology. Each of the frequency channels has a center frequency and a frequency channel bandwidth. The frequency channels may have partially overlapping frequencies. Hopping through different frequency channels of a set of frequency channels can be performed for avoiding interference of RF signals, for example, in case a multi-channel communication technology is used for performing RF-based sensing such as a Bluetooth communication protocol, e.g., Bluetooth low energy (BLE). Changing a frequency channel to another frequency channel of the set of frequency channels of the communication technology does not change the communication technology, if the communication technology is defined by the set of frequency channels. Changing a frequency channel of the communication technology to another frequency channel changes the communication technology, if the communication technology is defined by only one frequency channel.

The communication technology parameters can additionally include one or more of a demodulation and a directionality. For example, a certain modulation can be demodulated in different ways by two or more different demodulations, such as for example to balance a demodulation speed and a demodulation error rate. Directionality can for example include omnidirectional and directional transmission. Omnidirectional transmissions can, for example, allow a volumetric view of the sensing volume, while directional transmissions can, for example, allow a narrow beam, e.g. for scanning like a laser scanner or for having a fixed directionality.

The communication protocol included in the communication technology parameters for a certain communication technology can include a cellular radio communication protocol, Zigbee, Bluetooth, BLE, Thread, a WiFi communication protocol, or any other wireless communication protocol. In other words, the communication technologies may include communication protocols such as a cellular radio communication protocol, Zigbee, WiFi, BLE, Thread, or any other wireless communication protocol. Cellular radio communication protocols may, for example, include 5G, 4G, 3G, or any other cellular radio communication protocol. WiFi communication protocols may include protocols of the IEEE 802.11 family, such as IEEE 802.1 lax and IEEE 802.11 ay.

The frequency channels included in the communication technology parameter can for example include frequency values in the GHz range, such as 2.4 GHz band, 5 GHz band, and 60 GHz band, including for example different frequency channels in the same band, e.g., 2412 MHz and 2472 MHz in the 2.4 GHz band. The frequency channels may also include frequency values in the frequency bands ranging from 450 MHz to 6 GHz, e.g. for sub-6 GHz 5G or from 24.250 GHz to 52.600 GHz for millimeter-wave 5G.

The number of streams included in the communication technology parameter can for example include one or more streams, such as 2, 3, or 4 streams. The maximal number of streams can, for example, depend on the number of multiple input multiple output (MIMO) channels.

The modulation included in the communication technology parameter can for example include orthogonal frequency-division multiplexing (OFDM), direct-sequence spread spectrum (DSSS), frequency-hopping spread spectrum (FHSS), on-off keying (OOK), binary phase shift keying (BPSK), quadrature phase shift keying (QPSK), quadrature amplitude modulation (QAM), or any other modulation.

Values of the communication technology parameters can also be included and selected from standards, such as standards for communication protocols published by the IEEE, such as IEEE 802.15.4, IEEE 802.11ax, IEEE 802.11ay, or any other communication protocol.

A single-channel communication technology is a communication technology which transmits a RF message using a single frequency channel, i.e., the single-channel communication technology uses a single frequency channel with a certain center frequency and frequency channel bandwidth for transmitting the RF message. The single frequency channel can include a frequency range defined by the center frequency and the frequency channel bandwidth, i.e., the single frequency channel is not limited to its center frequency, but can also include neighboring frequencies in dependence of the frequency channel bandwidth. Furthermore, sideband emissions, i.e., out-of-band emissions, may occur outside of the standardized frequency band defined by the center frequency and frequency channel bandwidth. The single channel-communication technology may use a communication protocol which may in general allow performing RF-based sensing by using multiple frequency channels, which communication protocol, however, in this case is limited to using only one single frequency channel for transmitting the RF message. The single-channel communication technology may include, for example, Zigbee or a WiFi communication protocol. The single-channel communication technology may also include a single-channel communication protocol, i.e., a communication protocol which can perform RF-based sensing only by using a single frequency channel for transmitting the RF message. Using a single-channel communication technology for performing RF-based sensing may allow lowering calculation effort and complexity of RF-based sensing while a sensing event can at least be coarsely detected. The RF-based sensing device can be configured for performing RF-based sensing by the single-channel communication technology continuously or stop RF-based sensing by the single-channel communication technology for certain periods. The RF-based sensing device may be configured, for example, to perform RF-based sensing by the single-channel communication technology continuously, i.e., also in parallel to performing RF-based sensing based on the multi-channel communication technology. The RF-based sensing device may also stop performing RF-based sensing by the single-channel communication technology for certain periods, e.g., when another function is performed by the RF-based sensing device, such as providing lighting or performing RF-based sensing by a multi-channel communication technology.

A multi-channel communication technology is a communication technology which hops through multiple frequency channels during the transmission of a RF message. Alternatively or additionally, the multi-channel communication technology may also use the multiple frequency channels in parallel. The multi-channel communication technology may include a multi-channel communication protocol such as BLE. Each RF message may be chopped into parts and transmitted using different frequency channels of the multi-channel communication technology. For example, BLE can transmit the header of a RF message in the BLE channel 5, then the first half of the payload in channel 9, and the second half in channel 20. Using a multi-channel communication technology for performing RF-based sensing may allow RF-based sensing with higher accuracy. The RF-based sensing device may be configured, for example, to perform RF-based sensing based on the multi-channel communication technology by performing RF-based sensing by the multi-channel communication technology or by performing RF-based sensing by the multi-channel communication technology in parallel to performing RF-based sensing by the single-channel communication technology.

RF-based sensing allows for the detection of various events taking place in a space or specific volume. Sensing algorithms may detect and analyse how objects within the space affect RF signals. RF signals are used for transmitting RF messages. RF-based sensing may be used as means for detecting and classifying user activity in homes, offices, etc. For example, based on Zigbee messages being transmitted and received by RF-based sensing devices in form of smart lights, RF-based sensing may determine motion in a room and turn lights on or off automatically, RF-based sensing devices in form of WiFi routers may estimate breathing rate of people, etc.

The underlying principle for RF-based sensing is that distortions of RF signals in a space are both a function of the physical elements in it, e.g., moving objects, as well as of the frequency of the RF signals. When RF-based sensing hops through a series of very different frequency bands, e.g., from 2.4 GHz WiFi to 5 GHz WiFi and then to 60 GHz as used by the upcoming WiFi 6 standard, this may yield distinctively different passive sensing results. However, also frequency channels in the same frequency band, e.g., in 2.4 GHz WiFi Channel 1 at 2412 MHz and WiFi Channel 13 at 2472 MHz, will influence the RF-based sensing results.

RF-based sensing can be performed in a connected system including at least two RF-based sensing devices by transmitting RF signals from one RF-based sensing device to another RF-based sensing device and analysing the received RF signals. If the RF signals interact with one or more objects on their way between the RF-based sensing devices, the RF signals are disturbed, such as scattered, absorbed, reflected, or any combination thereof. These disturbances can be analysed and used for performing RF-based sensing.

If the RF-based sensing device is not included in a connected system with at least two RF-based sensing devices, the RF-based sensing device may perform RF-based sensing by transmitting RF signals into a specific volume, receiving reflected RF signals from the specific volume, and analysing the reflected RF signals. For example, one antenna of an antenna array of a RF-based sensing device can transmit the RF signals and another antenna of the antenna array of the same RF-based sensing device can receive the reflected RF signals, which allows analysing the reflected RF signals in the same RF-based sensing device that transmitted the RF signals. RF-based sensing can also be performed in this manner by multiple RF-based sensing devices of a connected system.

Alternatively or additionally, in a connected system including at least two RF-based sensing devices, one RF-based sensing device can transmit RF signals into a specific volume and the reflected RF signals can be received and analysed by another RF-based sensing device of the connected system for performing RF-based sensing.

The disturbed and/or reflected RF signals can include an RF-based sensing fingerprint based on signal parameters, such as real and imaginary part of electrical permittivity and magnetic susceptibility. Different communication technologies have different absorption and reflection characteristics resulting in different RF-based sensing fingerprints. Using different communication technologies can allow to optimize the performance of the RF-based sensing, as the multi-channel communication technology optimal for a current sensing application with a current sensing quality requirement in a current context, e.g., environment, and considering the available system resources can be selected based on the coarsely performed RF-based sensing based on the single-channel communication technology.

The RF-based sensing device may be configured for selecting the multi-channel communication technology additionally in dependence of the detected sensing event. Sensing events may include presence detection. Sensing events may further include motion detection, object counting, moveable object counting, breathing rate measurement, heart rate measurement, shape detection, gesture detection, people counting, simple motion detection, fine-grained motion detection, breathing detection, fall detection, heart beat detection, occupancy of a space detection, movement of an object detection, movement of a person detection, position measurement, proximity detection, proximity measurement, or any other sensing event. Presence detection may include presence related events (which at least requires/infer presence of a user) such as motion detection, object counting, moveable object counting, breathing rate measurement, heart rate measurement, shape detection, gesture detection, people counting, simple motion detection, fine-grained motion detection, breathing detection, fall detection, heart beat detection, occupancy of a space detection, movement of an object detection, movement of a person detection, position measurement, proximity detection, proximity measurement, fall detection. Presence detection may be an explicit detection of presence or an implicit detection of presence via other related sensing applications such as motion detection, breathing rate measurement, and others as mentioned above.

The RF-based sensing device may also be configured for selecting the multi-channel communication technology additionally based on data obtained based on performing RF-based sensing by the single-channel communication technology.

The RF-based sensing device may be configured for selecting the multi-channel communication technology such that the RF-based sensing is optimized, e.g., optimized with respect to accuracy or any other parameter. The RF-based sensing device may be configured, for example, for optimizing RF-based sensing in dependence of the combination of the single-channel communication technology and the multi-channel communication technology used for performing the RF-based sensing, i.e., the single-channel communication technology and the multi-channel communication technology can be coordinated such that their combination optimizes RF-based sensing. This may allow to enrich, verify, and/or extend findings of the RF-based sensing in comparison of performing RF-based sensing solely by the single-channel communication technology or solely by the multi-channel communication technology.

The RF-based sensing device may be configured for combining data obtained by performing RF-based sensing based on the multi-channel communication technology with data obtained by performing RF-based sensing by the single-channel communication technology in order to improve the RF-based sensing. Combining data of both communication technologies may allow increasing an accuracy of the RF-based sensing or verifying the sensing event detected by performing RF-based sensing by the single-channel communication technology. The data may be combined in order to improve the RF-based sensing performed by the single-channel communication technology, the multi-channel communication technology, or the single-channel communication technology and the multi-channel communication technology. The RF-based sensing device may be configured for combining the data obtained by performing RF-based sensing based on the multi-channel communication technology with data obtained concurrently by performing RF-based sensing by the single-channel communication technology.

The RF-based sensing device may be configured for combining the data, for example, for detecting sensing events which require a higher accuracy and/or for verifying the detected sensing event. The data may include, for example, RF signals, disturbed RF signals, reflected RF signals, and/or any other data related to performing RF-based sensing.

The RF-based sensing device may be configured for selecting the multi-channel communication technology such that the RF-based sensing is performed based on a coordinated frequency hopping between multiple frequency channels of the multi-channel communication technology. The coordinated frequency hopping may depend on the single-channel communication technology used for detecting the sensing event. This may provide richer sensing data than by using a single-channel communication technology or by using randomly or externally defined channel choices of existing multi-channel communication technologies.

The coordinated frequency hopping includes transmitting and receiving RF signals on a predetermined frequency channel of the multiple frequency channels for a predetermined duration and hopping to another predetermined frequency channel after the predetermined duration for transmitting and receiving RF signals for another predetermined duration. For example, a first part of a RF message may be transmitted and received on the predetermined frequency channel for the predetermined duration, e.g., until the first part of the RF message, such as its header is received, and a second part of the RF message may be transmitted and received by the other predetermined frequency channel for the other predetermined duration, e.g., until the second part of the RF message, such as its payload is received. Alternatively, for example, a first RF message may be transmitted and received on the predetermined frequency channel for the predetermined duration, e.g., until the whole first RF message is received, and a second RF message may be transmitted and received by the other predetermined frequency channel for the other predetermined duration, e.g., until the whole second RF message is received. The coordinated frequency hopping may include a predetermined number of hoppings between different frequency channels of the multiple frequency channels. Coordinated frequency hopping may be performed, for example, between frequency channels of BLE communication protocol.

The RF-based sensing device can be configured for determining the coordinated frequency hopping between the multiple frequency channels in dependence of the single-channel communication technology used for detecting the sensing event. The RF-based sensing device may be configured, for example, for determining the coordinated frequency hopping as a function of different criteria to achieve more accurate RF-based sensing. The criteria may include the frequency channel, which includes center frequency and/or frequency channel bandwidth, of the single-channel communication technology.

Data obtained by performing the coordinated frequency hopping between the multiple frequency channels of the multi-channel communication technology may be combined with data obtained by performing RF-based sensing by the single-channel communication technology before RF-based sensing is performed based on the multi-channel communication technology and/or with data obtained by performing RF-based sensing by the single channel communication technology in parallel to performing RF-based sensing based on the multi-channel communication technology. Preferably, the data obtained in parallel is combined. This may allow improving performance of RF-based sensing, as well as RF-based sensing accuracy.

The RF-based sensing device may be configured for performing the RF-based sensing by the single-channel communication technology in dependence of a setting of communication technology parameters of the single-channel communication technology. The setting of the communication technology parameters may be optimized for detecting the sensing event. Since the single-channel communication technology may be optimized for a certain sensing application, i.e., RF-based sensing of a specific sensing event, an improved coarse detection of the specific sensing event may be achieved.

The RF-based sensing device may be configured for determining a multi-channel communication technology that optimizes RF-based sensing in dependence of the setting of the communication technology parameters of the single-channel communication technology. Additionally, or alternatively, the RF-based sensing device may be configured for selecting the multi-channel communication technology that optimizes RF-based sensing as the multi-channel communication technology for performing the RF-based sensing. This may allow an improved RF-based sensing as well as an improved performance for performing RF-based sensing. The RF-Based Sensing Device May be Configured for selecting one or more frequency channels used by the multi-channel communication technology for performing RF-based sensing, or selecting a duration or durations for using each of the one or more frequency channels used by the multi-channel communication technology for performing RF-based sensing, or selecting both the one or more frequency channels used by the multi-channel communication technology for performing RF-based sensing and the duration or the durations for using each of the one or more frequency channels used by the multi-channel communication technology for performing RF-based sensing, when selecting the multi-channel communication technology in dependence of the single-channel communication technology used for detecting the sensing event. In other words, the RF-based sensing device may be configured for selecting one or more frequency channels used by the multi-channel communication technology for performing RF-based sensing and/or selecting a duration or durations for using each of the one or more frequency channels used by the multi-channel communication technology for performing RF-based sensing when selecting the multi-channel communication technology in dependence of the single-channel communication technology used for detecting the sensing event. This allows to improve RF-based sensing by letting the RF-based sensing application layer prescribe to a networking layer which frequency channels the RF-based sensing device should hop to and/or for which duration each frequency channel should be used.

Selecting the one or more frequency channels used by the multi-channel communication technology for performing RF-based sensing, selecting the duration or the durations for using each of the one or more frequency channels used by the multi-channel communication technology for performing RF-based sensing or the combination of them may be performed in dependence of the single-channel communication technology used for detecting the sensing event. These may also be performed in dependence of the detected sensing event, detection result, and/or data obtained by performing RF-based sensing by the single-channel communication technology.

The RF-Based Sensing Device May be Configured for at Least One of:

minimizing an overlap between a frequency channel used by the single-channel communication technology for performing RF-based sensing and the frequency channels used by the multi-channel communication technology for performing RF-based sensing, selecting the frequency channels used by the multi-channel communication technology for performing RF-based sensing such that at least one of the frequency channels used by the multi-channel communication technology for performing RF-based sensing overlaps at least partially with the frequency channel used by the single-channel communication technology for performing RF-based sensing, and maximizing an overlap between the frequency channel used by the single-channel communication technology for performing RF-based sensing and the frequency channels used by the multi-channel communication technology for performing RF-based sensing, when selecting the multi-channel communication technology in dependence of the single-channel communication technology used for detecting the sensing event. This may allow improving the RF-based sensing.

The RF-based sensing device can be configured for performing minimizing the overlap, maximizing the overlap, or selecting the frequency channels used by the multi-channel communication technology such that at least one of them overlaps at least partially with the frequency channel used by the single-channel communication technology, but it may perform only one of this three options when selecting the multi-channel communication technology in dependence of the single-channel communication technology used for detecting the sensing event at a certain time. The overlap may include sideband emissions, i.e., out-of-band emissions which, e.g., in practice bleed outside of the standardized frequency band.

Minimizing an overlap between the frequency channel used by the single-channel communication technology for performing RF-based sensing and the frequency channels used by the multi-channel communication technology for performing RF-based sensing allows an improved RF-based sensing of sensing events that affect at least to some extent all frequencies included in the frequency hopping. This may allow increasing a confidence level of classifying the sensing event as both sets of frequency channels being too close to each other would reach similar conclusions on what has happened.

The frequency channel used by the single-channel communication technology may have a larger frequency channel bandwidth than the frequency channels used by the multi-channel communication technology, i.e., the frequency channel bandwidth and/or the frequency channels used by the multi-channel communication technology can be selected such that they have a smaller frequency channel bandwidth than the frequency channel used by the single-channel communication technology.

The frequency channels used by the multi-channel communication technology can have higher frequencies than the frequency channel used by the single-channel communication technology, i.e., a highest frequency of the single frequency channel used by the single-channel communication technology considering its center frequency and its frequency channel bandwidth may be lower than any of the frequencies of the frequency channels of the multi-channel communication technology. Alternatively, the frequency channels used by the multi-channel communication technology can have lower frequencies than the frequency channel used by the single-channel communication technology, i.e., a lowest frequency of the single frequency channel used by the single-channel communication technology considering its center frequency and its frequency channel bandwidth may be higher than any of the frequencies of the frequency channels used by the multi-channel communication technology. Some of the frequencies of the frequency channels used by the multi-channel communication technology may also be higher than the frequencies of the frequency channel used by the single-channel communication technology and some other of the frequencies of the frequency channels used by the multi-channel communication technology may be lower than the frequencies of the frequency channel used by the single-channel communication technology. The frequency channels used by the multi-channel communication technology may be selected such that their frequencies do not overlap with any of the frequencies of the single frequency channel used by the single-channel communication technology considering its center frequency and its frequency channel bandwidth. Center frequencies of the frequency channels used by the multi-channel communication technology may be equally spaced with respect to their center frequencies to each other.

Selecting the frequency channels used by the multi-channel communication technology for performing RF-based sensing such that at least one of the frequency channels used by the multi-channel communication technology for performing RF-based sensing overlaps at least partially with the frequency channel used by the single-channel communication technology for performing RF-based sensing allows an improved RF-based sensing. This may allow confirming the sensing event based on the at least one frequency channel used by the multi-channel communication technology for performing RF-based sensing which at least partially overlaps with the frequency channel used by the single-channel communication technology for performing RF-based sensing. Additionally, this may allow providing additional insights as RF-based sensing may be additionally performed in non-overlapping frequency channels.

The frequencies of the frequency channels of the multi-channel communication technology for performing RF-based sensing may at least partially overlap, for example, towards a higher boundary or a lower boundary of the frequency of the frequency channel of the single-channel communication technology for performing RF-based sensing, i.e., the higher boundary corresponds to a frequency defined by the center frequency plus half of the frequency channel bandwidth and the lower boundary corresponds to a frequency defined by the center frequency minus half of the frequency channel bandwidth in case that the frequency channel is symmetric. The frequency channels used by the multi-channel communication technology for performing RF-based sensing may also at least partially overlap, for example, non-symmetrically with the frequency channel used by the single-channel communication technology for performing RF-based sensing.

Maximizing an overlap between the frequency channel used by the single-channel communication technology for performing RF-based sensing and the frequency channels used by the multi-channel communication technology for performing RF-based sensing allows an improved RF-based sensing in case that the frequency channel used by the single-channel communication technology has a significantly wider frequency channel bandwidth than each of the individual frequency channels used by the multi-channel communication technology. The RF-based sensing device may be configured for selecting frequency channels used by the multi-channel communication technology with frequencies that are within the frequency channel used by the single-channel communication technology and frequency channels which are adjacent to the frequency channel used by the single-channel communication technology. This may allow to more accurately detect whether the sensing event detected by the single-channel communication technology is a noise artifact or whether the multi-channel communication technology detects the sensing event as well. A noise artifact may be, for example, caused by another RF-based sensing device in proximity of the RF-based sensing device interfering on the frequency channel used by the single-channel communication technology. The noise artifact may also be caused, for example, by hardware problems, e.g., of an antenna of the RF-based sensing device resulting in noise on a certain frequency channel or a certain frequency range.

Some of the frequency channels used by the multi-channel communication technology for performing the RF-based sensing may be non-overlapping or at least partially non-overlapping with the frequency channel of the single-channel communication technology. Alternatively, all frequency channels used by the multi-channel communication technology for performing the RF-based sensing may be overlapping or at least partially overlapping with the frequency channel of the single-channel communication technology. The RF-based sensing device may be configured for removing, such as skipping, or avoiding frequency channels of the multi-channel communication technology for performing RF-based sensing which do not overlap or which do not at least partially overlap with the frequency channel used by the single-channel communication technology for performing RF-based sensing. The multi-channel communication technology may, for example, include or be BLE.

The RF-based sensing device may be configured for exchanging data based on the multi-channel communication technology. Exchanging data may include transmitting and receiving data, for example, including messages, pictures, or a firmware update. This may allow to improve data communication in case that the single-channel communication technology is also used, for example, for maintenance and/or infrastructure of a wireless network. This may furthermore allow to compensate bandwidth of the single-channel communication technology which can no longer be used by the single-channel communication technology, e.g., Zigbee, as it is used by the multi-channel communication technology, e.g., BLE.

Alternatively or additionally, the RF-based sensing device can be configured for exchanging data based on the single-channel communication technology. Using both the multi-channel communication technology, e.g. BLE, and the single-channel communication technology, e.g., Zigbee, for exchanging data allows to increase an overall bandwidth for data communication.

The RF-based sensing device can be configured for using, for example, RF signals for sensing and for exchanging data at the same time. Therefore, the RF signals may contain specific payload containers which contain data for data exchange. This allows to perform sensing and exchange data at the same time in contrast to performing RF-based sensing with RF signals that do not contain specific payload containers or which are empty.

The RF-based sensing device can be configured for exchanging data with another RF-based sensing device. This allows direct communication between the RF-based sensing devices without the need of a wireless base station.

The RF-Based Sensing Device May be Configured for
   adjusting transmit power or beam form or beam direction of the single-channel communication technology for performing RF-based sensing,
   adjusting transmit power or beam form or beam direction of the multi-channel communication technology for performing RF-based sensing, or
   adjusting transmit power or beam form or beam direction of both the single-channel communication technology and the multi-channel communication technology for performing RF-based sensing. This allows to provide an additional degree of freedom to optimize the RF-based sensing. This may allow to improve verification of a detected sensing event. The transmit power may be adjusted based on the sensing event, the detection result, the single-channel communication technology used for performing RF-based sensing and/or the multi-channel communication technology used for performing RF-based sensing. Alternatively, or additionally, the beam form may be adjusted based on the sensing event, the detection result, the single-channel communication technology used for performing RF-based sensing and/or the multi-channel communication technology used for performing RF-based sensing. Alternatively, or additionally, the beam direction may be adjusted based on the sensing event, the detection result, the single-channel communication technology used for performing RF-based sensing and/or the multi-channel communication technology used for performing RF-based sensing. For example, beam shaping radios with multiple antennas may be used in 5 GHz and 60 GHz WiFi.

For example, the RF-based sensing device may reduce the number of frequency channels used by the multi-channel communication technology for performing RF-based sensing and increase the transmit power in the remaining frequency channels, e.g., instead of hopping through 16 frequency channels at 0 dBm, the multi-channel communication technology may hop through 10 frequency channels at +3 dBm.

The RF-based sensing device may be configured for performing RF-based sensing based on the multi-channel communication technology with different transmit powers for the different frequency channels used by the multi-channel communication technology for performing RF-based sensing. The RF-based sensing device may be configured, for example, to adjust the transmit powers for the different frequency channels used by the multi-channel communication technology to optimize RF-based sensing, e.g., by increasing transmit power for frequency channels which require it in order to provide better RF-based sensing, e.g., due to a higher sensitivity or more noise in the frequency channels.

The RF-Based Sensing Device May be Configured for Providing at Least One of
- a frequency hopping sequence for frequency channels used by the multi-channel communication technology for performing RF-based sensing,
- a duration for performing RF-based sensing in a certain one of the frequency channels used by the multi-channel communication technology for performing RF-based sensing,
- a repetition order of the frequency channels, in dependence of the single-channel communication technology for performing RF-based sensing.

The RF-based sensing device may also be configured, for example, for providing the frequency hopping sequence for the frequency channels used by the multi-channel communication technology for performing RF-based sensing in dependence of the frequency channel used by the single-channel communication technology for performing RF-based sensing. The RF-based sensing device may also be configured, for example, for providing the duration for performing RF-based sensing in a certain one of the frequency channels used by the multi-channel communication technology for performing RF-based sensing in dependence of the frequency channel used by the single-channel communication technology for performing RF-based sensing. The RF-based sensing device may also be configured, for example, for providing the repetition order of the frequency channels in dependence of the frequency channel used by the single-channel communication technology for performing RF-based sensing.

The repetition order of the frequency channels may be, for example, 1, 2, 3, 2, for three different frequency channels 1, 2, and 3 if frequency channel 2 happens to be contextually more useful. This may allow detecting an influence of short-duration events through different frequencies or to mitigate an impact of noise for frequency channels that partially overlap with a noisy frequency.

The RF-based sensing device may comprise a processor. Alternatively, or additionally, the RF-based sensing device may comprise a transceiver unit.

The processor may be configured for processing data, such as RF signals, disturbed RF signals and reflected RF signals, e.g., in order to perform RF-based sensing and to detect sensing events.

The transceiver unit may be configured for transmitting and receiving RF signals, e.g., for performing RF-based sensing by at least one single-channel communication technology and at least one multi-channel communication technology.

The transceiver unit may include, for example, a cellular radio for performing RF-based sensing by the multi-channel communication technology and a Zigbee radio for performing RF-based sensing by the single-channel communication technology.

The RF-based sensing device may be configured for performing a function, e.g., providing light, or providing temperature regulation, e.g., by heating or cooling. The RF-based sensing device may be included in or be, for example, a luminaire of a parking lot, i.e., a RF-based sensing device with a light providing function. The luminaire may include a dual radio including a cellular radio and a Zigbee radio. The RF-based sensing device may also be configured for site and area lighting, e.g., being a luminaire arranged adjacent to a building. The RF-based sensing device may be used, for example, in a smart home application, in a building management system (BMS), in an office environment, or for outdoor applications such as parking lots or street lighting. The RF-based sensing device may use different communication technologies such as Zigbee, BLE, WiFi, and/or Thread.

In a further aspect of the present invention a connected system for performing RF-based sensing is presented. The connected system includes at least two RF-based sensing devices according to at least one of the claims 1 to 10 or any embodiment of the RF-based sensing device. This may allow to provide a connected system for performing improved RF-based sensing.

The RF-based sensing devices of the connected system may form a wireless network. The RF-based sensing devices may be, for example, luminaires of a parking lot or they may be included in luminaires of a parking lot.

At least one of the RF-based sensing devices of the connected system may be configured for performing RF-based sensing by the single-channel communication technology. The connected system may be configured upon detection of a sensing event by the single-channel communication technology to perform RF-based sensing based on the multi-channel communication technology on at least one, e.g., at least two, of the RF-based sensing devices. This allows to reduce calculation effort and power consumption in comparison of continuously performing RF-based sensing by the multi-channel communication technology on multiple or all RF-based sensing devices of the connected system.

The single-channel communication technology may be, for example, Zigbee. The multi-channel communication technology may be, for example, a cellular radio, such as 5G cellular radio. 5G radio has a much higher bandwidth than Zigbee and a much higher number of frequency channels ranging from 450 MHz to 6 GHz, e.g., for sub-6 GHz 5G or even from 24.250 GHz to 52.600 GHz, e.g., for millimeter-wave 5G frequencies. This may allow providing very detailed RF-based sensing.

In a further aspect of the present invention a method for performing RF-based sensing is presented. The method comprises the steps:
- performing RF-based sensing by a single-channel communication technology in order to detect a sensing event, and Upon Detection of the Sensing Event:
- selecting a multi-channel communication technology in dependence of the single-channel communication technology used for detecting the sensing event, and
- performing RF-based sensing based on the multi-channel communication technology. This allows to provide an improved method for performing RF-based sensing.

The Method May Comprise at Least One of the Steps:
- combining data obtained by performing RF-based sensing based on the multi-channel communication technology with data obtained by performing RF-based sensing by the single-channel communication technology in order to improve the RF-based sensing,
- selecting the multi-channel communication technology such that the RF-based sensing is performed based on a coordinated frequency hopping between multiple frequency channels of the multi-channel communication technology, wherein the coordinated frequency hopping depends on the single-channel communication technology used for detecting the sensing event,
- performing the RF-based sensing by the single-channel communication technology in dependence of a setting of communication technology parameters of the single-channel communication technology that is optimized for detecting the sensing event, selecting one or more frequency channels used by the multi-channel communication technology for performing RF-based sensing when selecting the multi-channel communication technology in dependence of the single-channel communication technology used for detecting the sensing event, selecting a duration or durations for using each of the one or more frequency channels used by the multi-channel communication technology for performing RF-based sensing when selecting the multi-channel communication technology in dependence of the single-channel communication technology used for detecting the sensing event, selecting both the one or more frequency channels used by the multi-channel communication technology for performing RF-based sensing and the duration or the durations for using each of the one or more frequency channels used by the multi-channel communication technology for performing RF-based sensing when selecting the multi-channel communication technology in dependence of the single-channel communication technology used for detecting the sensing event, minimizing an overlap between a frequency channel used by the single-channel communication technology for performing RF-based sensing and the frequency channels used by the multi-channel communication technology for performing RF-based sensing when selecting the multi-channel communication technology in dependence of the single-channel communication technology used for detecting the sensing event, selecting the frequency channels used by the multi-channel communication technology for performing RF-based sensing such that at least one of the frequency channels used by the multi-channel communication technology for performing RF-based sensing overlaps at least partially with the frequency channel used by the single-channel communication technology for performing RF-based sensing when selecting the multi-channel communication technology in dependence of the single-channel communication technology used for detecting the sensing event, maximizing an overlap between the frequency channel used by the single-channel communication technology for performing RF-based sensing and the frequency channels used by the multi-channel communication technology for performing RF-based sensing when selecting the multi-channel communication technology in dependence of the single-channel communication technology used for detecting the sensing event, exchanging data based on the multi-channel communication technology, adjusting transmit power or beam form or beam direction of the single-channel communication technology for performing RF-based sensing, adjusting transmit power or beam form or beam direction of the multi-channel communication technology for performing RF-based sensing, adjusting transmit power or beam form or beam direction of both the single-channel communication technology and the multi-channel communication technology for performing RF-based sensing, providing a frequency hopping sequence for frequency channels used by the multi-channel communication technology for performing RF-based sensing in dependence of the single-channel communication technology for performing RF-based sensing, providing a duration for performing RF-based sensing in a certain one of the frequency channels used by the multi-channel communication technology for performing RF-based sensing in dependence of the single-channel communication technology for performing RF-based sensing, providing a repetition order of the frequency channels in dependence of the single-channel communication technology for performing RF-based sensing. Each of the steps may improve the method for performing RF-based sensing.

In a further aspect of the present invention a computer program product for performing RF-based sensing is presented. The computer program product comprises program code means for causing a processor to carry out the method(s) provided herein or any embodiments of the method, when the computer program product is run on the processor.

In a further aspect a computer readable medium having stored the computer program product is presented. Alternatively, or additionally, the computer readable medium can have the computer program product according to any embodiment of the computer program product stored.

It shall be understood that the RF-based sensing device(s) provided herein, the connected system(s) provided herein, the method(s) provided herein, the computer program product(s) provided herein, and the computer readable medium provided herein can have similar and/or identical preferred embodiments, in particular, as defined throughout.

It shall be understood that a preferred embodiment of the present invention can also be any combination of the embodiment(s) and/or feature(s) provided herein with any other embodiment(s) and/or feature(s) provided herein.

These and other aspects of the invention will be apparent from and elucidated with reference to the embodiments described hereinafter.

DETAILED DESCRIPTION OF EMBODIMENTS

Figure 1:
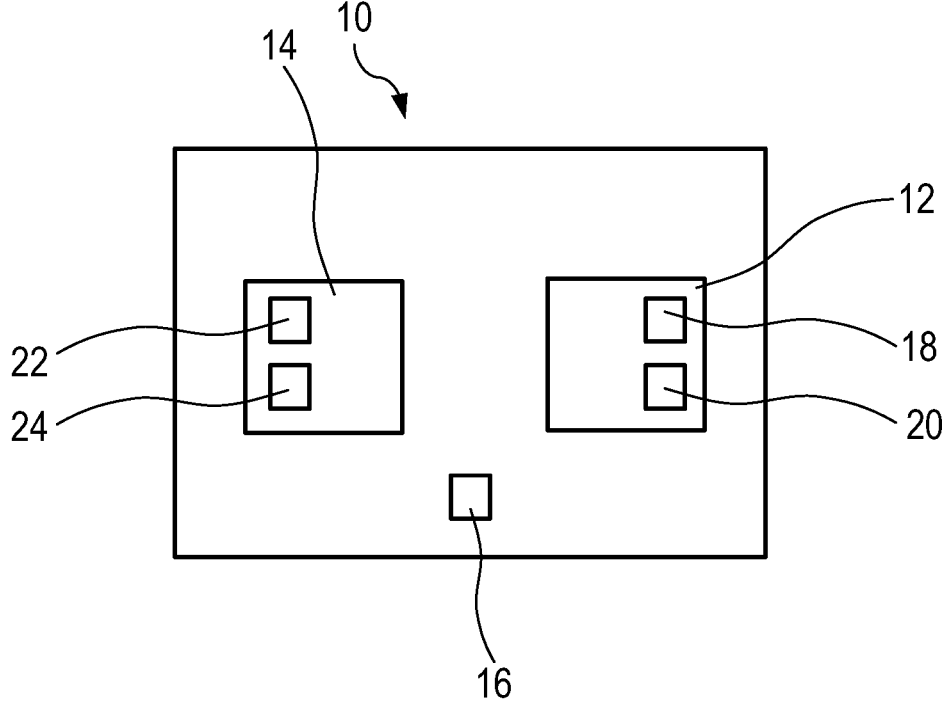
FIG. 1 shows schematically and exemplarily an embodiment of a RF-based sensing device for performing RF-based sensing.

FIG. 1 shows schematically and exemplarily an embodiment of a RF-based sensing device 10. The RF-based sensing device 10 is used for performing RF-based sensing. The RF-based sensing device 10 may perform, for example, RF-based sensing in a connected system including one or more nodes, such as in a connected lighting (CL) system, e.g. CL system 100 presented in FIGS. 2 and 3.

In the CL system, the nodes can for example be routers, bridges, lights, luminaires, switches, or sensors. This allows using the wireless infrastructure of the CL system to perform RF-based sensing, increasing the functionality of the CL system. RF-based sensing can, for example, be used for motion detection, presence detection, people counting, breathing rate measurements, heart rate measurements, shape detection, gesture detection, fall detection, or for performing other sensing applications.

The RF-based sensing device 10 comprises a control unit 12, a transceiver unit 14, and an antenna array 16. Instead of an antenna array, a single antenna may also be included in the RF-based sensing device. The transceiver unit 14 and the antenna array 16 are optional. The RF-based sensing device 10 can be included in a node that includes a transceiver unit and antenna array, such that the RF-based sensing device can use the transceiver unit and antenna array of the node. Alternatively, the RF-based sensing device may also be a node, e.g., a light, a luminaire, a switch, a sensor, or any other node.

The control unit 12 includes a processor 18 and a computer readable medium in form of memory 20.

In this embodiment, the transceiver unit 14 includes a single-channel communication technology transceiver in form of a Zigbee transceiver 22 and a multi-channel communication technology transceiver in form of a BLE transceiver 24. The Zigbee transceiver 22 uses a specific Zigbee communication technology in this embodiment. The Zigbee communication technology can for example use values of the communication technology parameters of one of the alternatives as defined by the IEEE 802.15.4 communication protocol and/or the Zigbee standard. The BLE transceiver 24 uses BLE communication technology. In this embodiment, the BLE transceiver 24 can be operated with multiple different frequency channels. In other embodiments, various other communication technologies may be used, such as WiFi, cellular radio, Thread, or any other communication technology.

The transceiver unit 14 uses the antenna array 16 for transmitting RF signals to nodes and receiving RF signals from nodes of the CL system for exchanging data including RF messages wirelessly between the nodes and for performing RF-based sensing. RF signals transmitted from one node to another node are disturbed by objects within a specific volume between the nodes. The RF signals disturbed by an object in the specific volume can be analysed in the control unit 12. The RF signals can use the Zigbee communication technology or the BLE communication technology. In other embodiments, the transceivers of the transceiver unit can be used for performing RF-based sensing by transmitting RF signals into a specific volume and by receiving and analysing reflected RF signals from the specific volume by the same node. The RF signals can also be transmitted into the specific volume by one node and disturbed and/or reflected RF signals can be received and analysed by another node.

The memory 20 of the control unit 12 stores a computer program product for performing RF-based sensing. The computer program product includes program code means for causing processor 18 to carry out a method for performing RF-based sensing when the computer program product is run on the processor 18, e.g., the method as presented in FIG. 7. The memory 20 further includes a computer program product for operating the RF-based sensing device 10 and optionally also the CL system, e.g., for controlling the functions of the RF-based sensing device and controlling the functions of the nodes of the CL system, for example, in order to provide lighting as well as for performing RF-based sensing.

Furthermore, the memory 20 stores settings of communication technology parameters of the communication technologies used for performing RF-based sensing.

In the following the functionality of the RF-based sensing device 10 is explained.

The RF-based sensing device 10 performs RF-based sensing by a single-channel communication technology in order to detect a sensing event. In this embodiment, the RF-based sensing device 10 performs RF-based sensing by the single-channel communication technology in dependence of a setting of communication technology parameters of the single-channel communication technology that is optimized for detecting the sensing event, i.e., the setting is optimized for the respective sensing application. Therefore, a frequency channel sensitive to the sensing event is selected. Furthermore, the transmit power is adjusted. In other embodiments, additionally, or alternatively, beam form and/or beam direction may be adjusted.

The transceiver unit 14 uses the Zigbee transceiver 22 for performing RF-based sensing using the setting of communication technology parameters optimized for detecting the sensing event. Performing RF-based sensing by a single-channel communication technology may allow to lower the complexity of the RF-based sensing and be good enough to determine coarsely that a sensing event has occurred.

Upon detecting the sensing event, the RF-based sensing device 10 selects a multi-channel communication technology in dependence of the single-channel communication technology used for detecting the sensing event. In other embodiments, the RF-based sensing device may select the multi-channel communication technology additionally in dependence of a detection result, e.g., a confidence level, or data obtained by performing RF-based sensing by the single-channel communication technology.

In this embodiment, selection of the multi-channel communication technology is performed by the control unit 12 of the RF-based sensing device 10. The control unit 12 selects the multi-channel communication technology such that the RF-based sensing is performed based on a coordinated frequency hopping between multiple frequency channels of the multi-channel communication technology. The coordinated frequency hopping depends on the single-channel communication technology used for detecting the sensing event.

In this embodiment, the multi-channel communication technology is a BLE communication technology. Therefore, the control unit 12 does not need to select a communication protocol in this embodiment, but only other communication technology parameters. In other embodiments, different communication protocols may be available for the multi-channel communication technology.

The control unit 12 determines a multi-channel communication technology that optimizes RF-based sensing in dependence of the setting of the communication technology parameters of the single-channel communication technology. The control unit 12 then selects the multi-channel communication technology that optimizes RF-based sensing as the multi-channel communication technology for performing the RF-based sensing.

The multi-channel communication technology that optimizes RF-based sensing in dependence of the setting of the communication technology parameters of the single-channel communication technology, can be, for example, the multi-channel communication technology that allows to verify the sensing event with lowest energy consumption or that allows to perform RF-based sensing for the sensing event with highest accuracy, i.e., it depends on the sensing application.

In order to optimize the RF-based sensing, the control unit 12 selects one or more frequency channels used by the multi-channel communication technology for performing RF-based sensing and a duration or durations for using each of the one or more frequency channels used by the multi-channel communication technology for performing RF-based sensing. In other embodiments, the RF-based sensing device may also be configured for selecting one or more frequency channels used by the multi-channel communication technology for performing radio frequency based sensing or for selecting a duration or durations for using each of the one or more frequency channels used by the multi-channel communication technology for performing radio frequency based sensing.

Selection of the frequency channels may be performed according to different scenarios, e.g., as presented in FIG. 4A to FIG. 6C.

Figure 4A:
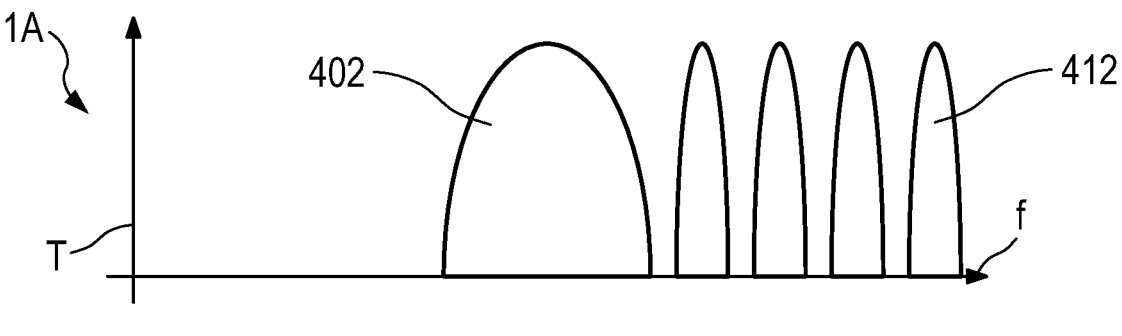
FIG. 4A shows a scenario 1A for selecting frequency channels of the multi-channel communication technology in dependence of the frequency channel of the single-channel communication technology.
Figure 4B:
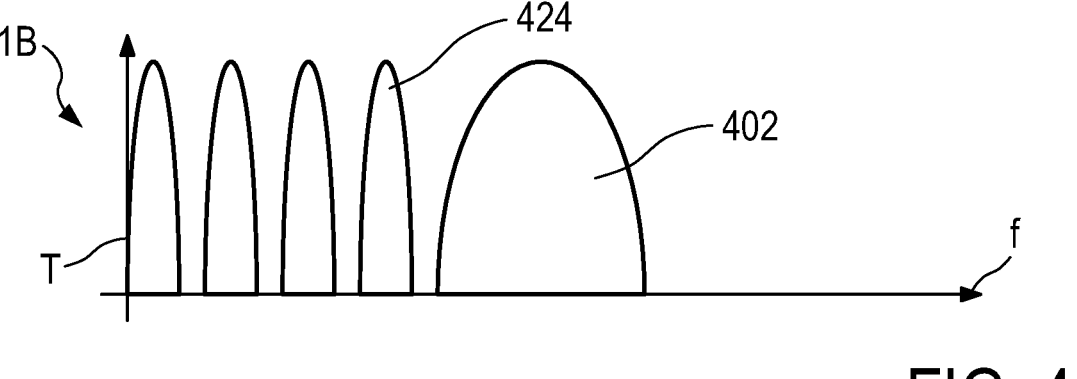
FIG. 4B shows a scenario 1B for selecting frequency channels of the multi-channel communication technology in dependence of the frequency channel of the single-channel communication technology.
Figure 4C:
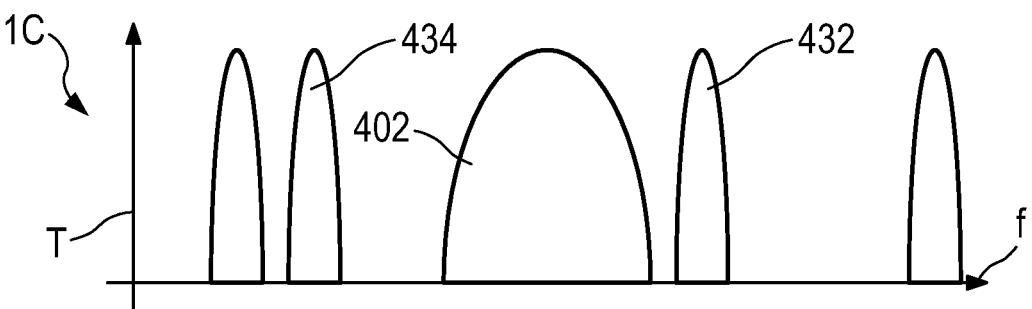
FIG. 4C shows a scenario 1C for selecting frequency channels of the multi-channel communication technology in dependence of the frequency channel of the single-channel communication technology.

The control unit 12 may minimize an overlap between a frequency channel used by the single-channel communication technology for performing RF-based sensing and the frequency channels used by the multi-channel communication technology for performing RF-based sensing as presented in scenario 1A in FIG. 4A, scenario 1B in FIG. 4B, and scenario 1C in FIG. 4C.

Figure 5A:
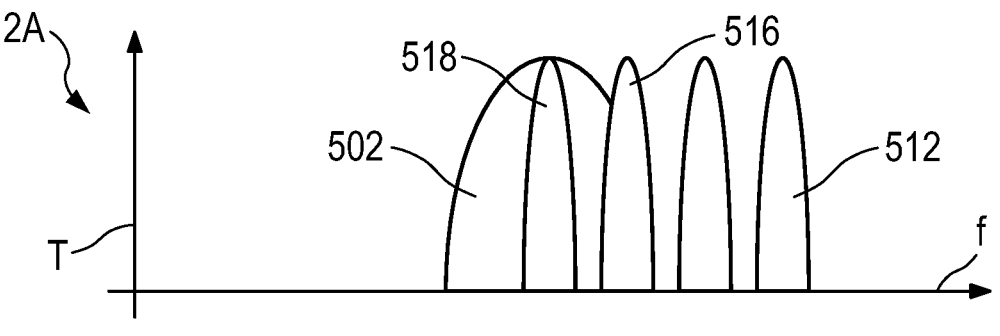
FIG. 5A shows a scenario 2A for selecting frequency channels of the multi-channel communication technology in dependence of the frequency channel of the single-channel communication technology.
Figure 5B:
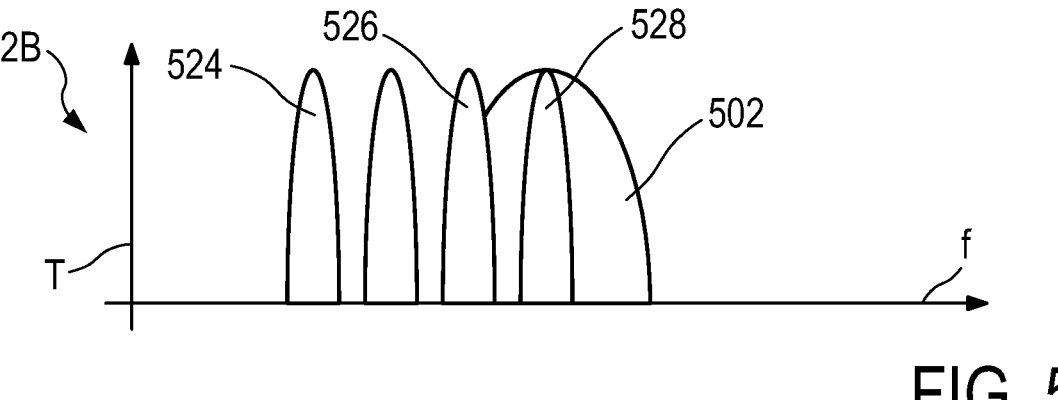
FIG. 5B shows a scenario 2B for selecting frequency channels of the multi-channel communication technology in dependence of the frequency channel of the single-channel communication technology.
Figure 5C:
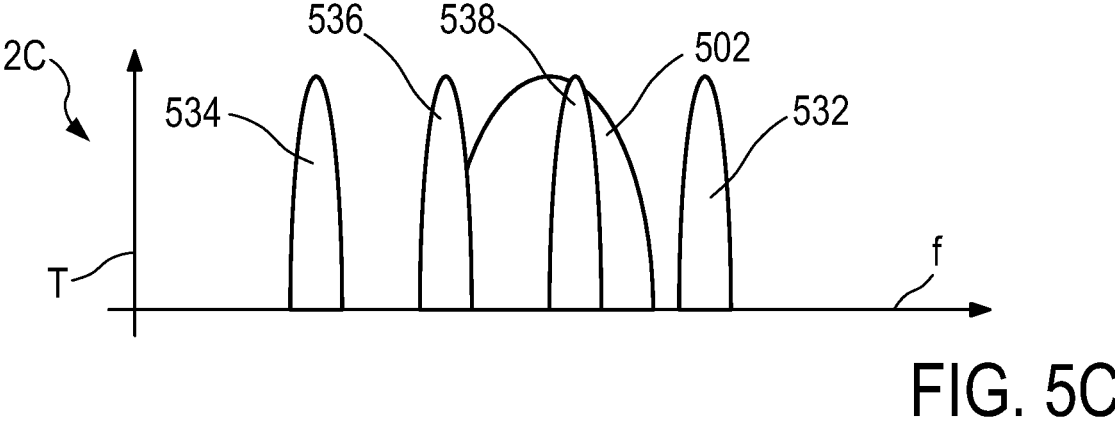
FIG. 5C shows a scenario 2C for selecting frequency channels of the multi-channel communication technology in dependence of the frequency channel of the single-channel communication technology.

The control unit 12 may also select the frequency channels used by the multi-channel communication technology for performing RF-based sensing such that at least one of the frequency channels used by the multi-channel communication technology for performing RF-based sensing overlaps at least partially with the frequency channel used by the single-channel communication technology for performing RF-based sensing as presented in scenario 2A in FIG. 5A, scenario 2B in FIG. 5B, and scenario 2C in FIG. 5C.

Alternatively, the control unit 12 may maximize an overlap between the frequency channel used by the single-channel communication technology for performing RF-based sensing and the frequency channels used by the multi-channel communication technology for performing RF-based sensing.

Furthermore, the control unit 12 also provides a frequency hopping sequence for the frequency channels used by the multi-channel communication technology for performing RF-based sensing, as well as a repetition order of the frequency channels in dependence of the single-channel communication technology for performing RF-based sensing.

After selecting the multi-channel communication technology that optimizes RF-based sensing, the RF-based sensing device 10 performs RF-based sensing based on the multi-channel communication technology. Using the multi-channel communication technology for performing RF-based sensing upon detection of the sensing event, may allow to provide richer sensing data as the RF signals are influenced by a sequence and selection of frequency channels used by the multi-channel communication technology. This allows to do more fine-grained detection of events, perform classification of the event type, and/or further increase the confidence on the first event triggers from the coarse RF-based sensing.

In this embodiment, RF-based sensing is performed in parallel by the multi-channel communication technology and the single-channel communication technology. Additionally, the control unit 12 adjusts the transmit power for performing RF-based sensing of both the single-channel communication technology and the multi-channel communication technology in order to optimize the RF-based sensing. For example, frequency channels that are sensitive for detecting the sensing event are provided with more transmit power while frequency channels that are not sensitive, are provided with less transmit power. Additionally, noise caused by interference between the two communication technologies may be reduced by adjusting their transmit powers. In other embodiments, the transmit power for performing RF-based sensing of the single-channel communication technology or the transmit power for performing RF-based sensing of the multi-channel communication technology may be adjusted by the RF-based sensing device. In other embodiments, additionally, or alternatively, beam form and beam direction of the single-channel communication technology and/or the multi-channel communication technology may be adjusted.

By performing RF-based sensing, data which includes RF signals, as well as disturbed and reflected RF signals, is obtained.

In this embodiment, the control unit 12 combines the data obtained by performing RF-based sensing based on the multi-channel communication technology with the data obtained by performing RF-based sensing by the single-channel communication technology in order to improve the RF-based sensing. The combination of the data may be used for complementing the initial detection, i.e., give additional information on the detected sensing event, which is not detectable by the single-channel communication technology or for confirming initial findings obtained by the single-channel communication technology.

The RF-based sensing device may exchange data based on the multi-channel communication technology and/or based on the single-channel communication technology.

In summary, the RF-based sensing device allows to carefully stage the RF-based sensing from during a first time period in which RF-based sensing is performed by the single-channel communication technology to determine whether a possible sensing event just may have taken place, and after a sensing event has been detected, to perform RF-based sensing based on the multi-channel communication technology with a highly orchestrated frequency hopping that is configurable as a function of different criteria to integrally achieve more accurate RF-based sensing.

Figure 2:
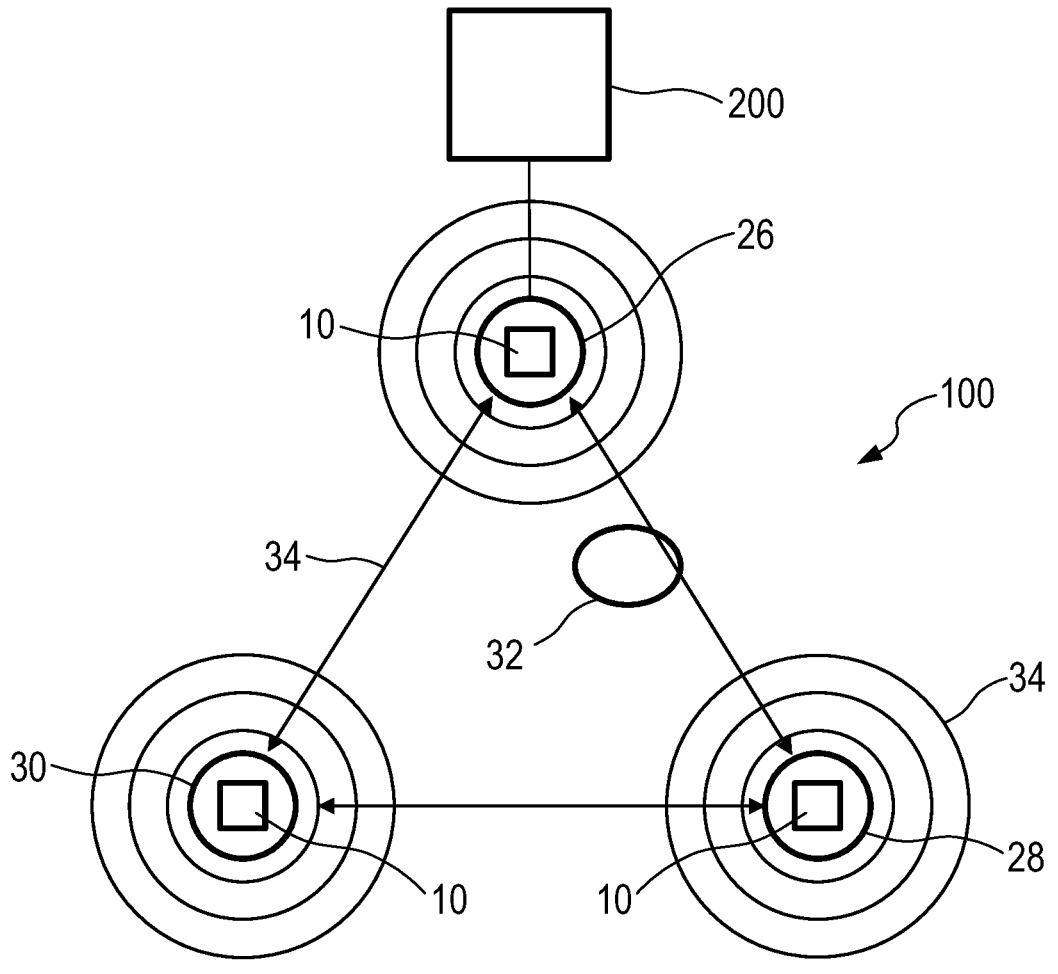
FIG. 2 shows schematically and exemplarily an embodiment of a connected system with three RF-based sensing devices performing RF-based sensing by a single-channel communication technology.
Figure 3:
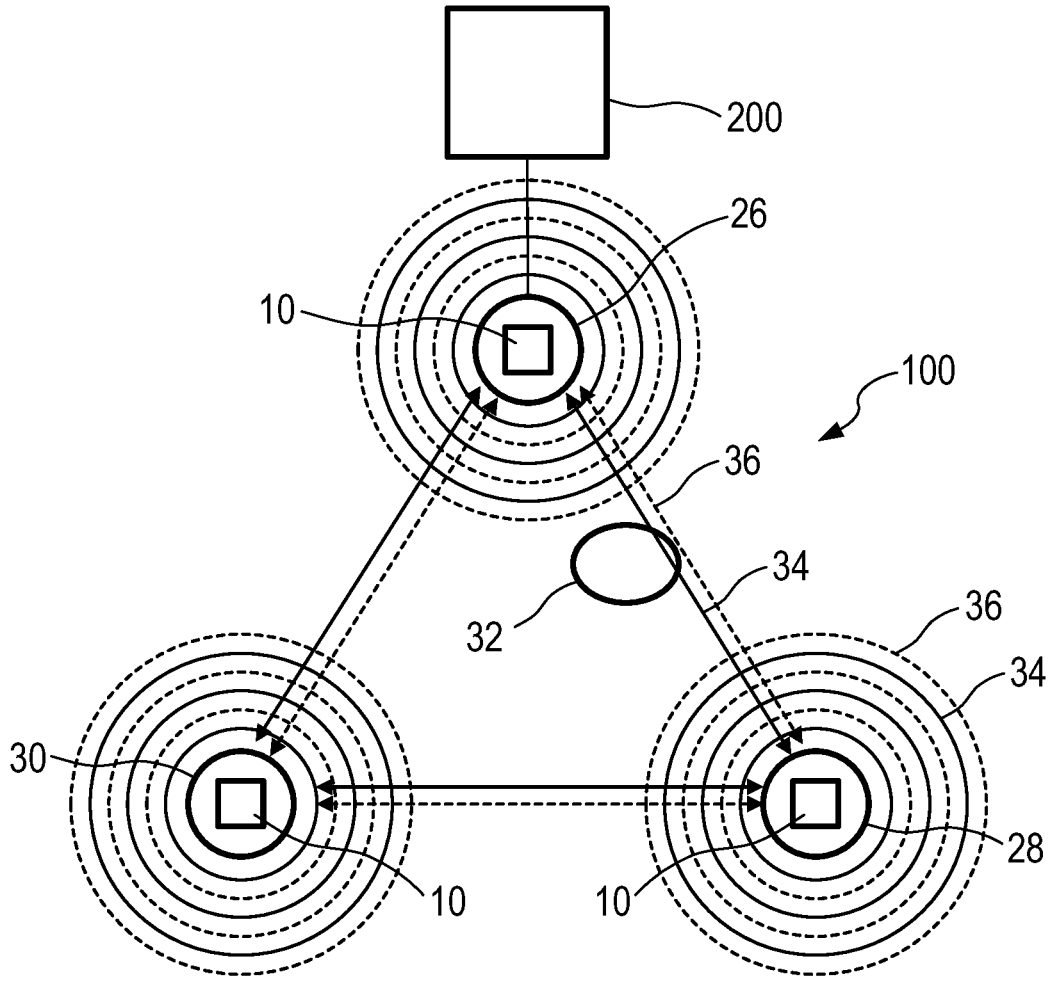
FIG. 3 shows schematically and exemplarily an embodiment of the connected system of FIG. 2 with the three RF-based sensing devices performing RF-based sensing by a multi-channel communication technology and by the single-channel communication technology.

FIGS. 2 and 3 show schematically and exemplarily an embodiment of a connected system in form of a CL system 100. The CL system 100 can be used for performing RF-based sensing. The CL system 100 includes three RF-based sensing devices 10 as presented in FIG. 1. In other embodiments the connected system may also include a different number of RF-based sensing devices, e.g., two, four or more.

In this embodiment, the RF-based sensing devices 10 are included in nodes 26, 28, and 30. In other embodiments, the RF-based sensing device may also be nodes themselves. The three nodes are a bridge 26, and two luminaires 28 and 30. The CL system 100 is connected to a server 200 via the bridge 26. The server 200 is a server of a BMS and serves for controlling the lighting functions of the CL system 100.

The bridge 26 and the luminaires 28 and 30 perform RF-based sensing in order to detect the motion of a moveable object in form of a person 32. In other embodiments, the connected system may also be used for any other sensing application by performing RF-based sensing. Other sensing applications can for example include people counting or breathing measurements.

In this embodiment, the bridge 26 and the luminaires 28 and 30 perform RF-based sensing by the single-channel communication technology using Zigbee RF signals 34 as shown in FIG. 2. Upon detection of a sensing event, RF-based sensing is performed based on the multi-channel communication technology using BLE RF signals 36 in addition to performing RF-based sensing by the single-channel communication technology using the Zigbee RF signals 34 as shown in FIG. 3. In other embodiments, different communication technologies may be used for performing RF-based sensing.

In this embodiment, the RF-based sensing devices 10 perform RF-based sensing by the single-channel communication technology continuously and only perform RF-based sensing based on the multi-channel communication technology upon detecting a sensing event by the single-channel communication technology. The RF-based sensing performed based on the multi-channel communication technology may be performed until a certain event occurs, e.g., the sensing event is not detected by the single-channel and/or multi-channel communication technology anymore, a certain duration has lapsed, or any other event.

In other embodiments, at least one of the RF-based sensing devices may be configured for performing RF-based sensing by the single-channel communication technology and the connected system may be configured upon detection of a sensing event by the single-channel communication technology to perform RF-based sensing based on the multi-channel communication technology on at least two of the RF-based sensing devices.

In the following several embodiments of connected systems, in particular CL systems, are presented without figures that have differently mixed node arrangements and which perform different sensing applications.

In an embodiment, in which the single-channel communication technology is used for maintenance and/or infrastructure of a wireless network, under certain circumstances, performing RF-based sensing based on the multi-channel communication technology may influence throughput and latency performance of the backbone network. In such a case, the connected system may choose to additionally use the multi-channel communication technology for exchanging data and not just for performing RF-based sensing. By combining, for example, the throughput of a Zigbee and a BLE network, the overall bandwidth for data backhaul may still be acceptable for the needs of the primary non-sensing tasks of the network. For example, BLE RF signals may contain specific payload containers which might be empty normally but now may contain data, such as desirable messages. These extra messages may compensate for lost bandwidth on Zigbee, which can no longer be serviced due to performing RF-based sensing based on the multi-channel communication technology.

In yet another embodiment, a connected system in form of a site and area lighting system adjacent to a commercial building is presented. The site and area lighting system may include luminaires on a parking lot. The luminaires may be implemented with a transceiver unit including a cellular radio in form of a 5G radio and a Zigbee radio. The 5G radio allows for device to device communication without involvement of the cellular base station. This allows among others for vehicle-to-everything (V2X) communication. The luminaires may perform RF-based sensing using low power Zigbee in order to sense a movement event or detect occupancy by an object. Upon detecting a possible event, the site and area lighting system may activate on at least two of the luminaires the 5G cellular radio in a device to device cellular communication mode. The 5G radio has vastly more bandwidth than Zigbee, as well as vastly different frequency bands ranging from 450 MHz to 6 GHz for sub-6 GHz 5G or even from 24.250 GHz to 52.600 GHz for millimeter-wave 5G. While the power consumption required for 5G is well beyond Zigbee, it allows to provide very feature rich RF-based sensing due to its high throughput and sophisticated radio design.

In another embodiment, the connected system may adjust the transmit power of the single-channel communication technology and/or the multi-channel communication technology. This gives an additional degree of freedom when trying to determine the validity of a sensing event. For example, the connected system may reduce the number of frequency channels through which to hop in exchange for higher transmit power through the remaining frequency channels, i.e., corresponding to setting the transmit power and duration to zero for the frequency channels through which no hopping is performed. For example, instead of hopping through 16 channels at 0 dBm, the system may hop through 10 channels at +3 dBm. The connected system may, furthermore, provide a dedicated transmit power for each different frequency channel in the hopping sequence. This allows providing relative weights to the frequency channels, such that frequency channels for which a larger sensitivity or higher noise is expected, may have higher or lower weights.

In yet another embodiment, the connected system may also orchestrate the sequence of the frequency channels, the duration each of the frequency channels is used for performing RF-based sensing as well as a repetition order in dependence of the frequency channel used by the single-channel communication technology. The repetition order of the frequency channels may, for example, have cycles like 1, 2, 3, i.e., frequency channel 1, frequency channel 2, and frequency channel 3. The repetition order may also have cycles like 1, 2, 3, 2, e.g., if frequency channel 2 may allow an improved RF-based sensing. Frequency channel 2 may be, for example, more contextually useful. This may help in detecting an influence of short-duration events through different frequency channels, or to mitigate an impact that noise may have when the frequency channels for hopping are partially overlapping with those of the frequency channel used by the single-channel communication technology.

FIGS. 4A, 4B, 4C, 5A, 5B, 5C, 6A, 6B, and 6C show nine scenarios 1A, 1, 1C, 2A, 2B, 2C, 3A, 3B, 3C for selecting frequency channels used by the multi-channel communication technology for performing RF-based sensing in dependence of a frequency channel 402, 502, and 602 used by the single-channel communication technology for performing RF-based sensing. Each of the scenarios 1A to 3C shows frequency f in GHz on the horizontal axis and transmit power T in dBm on the vertical axis. In this embodiment, the frequency channels 402, 502, and 602 used by the single-channel communication technology for performing RF-based sensing have a larger frequency bandwidth than each of the frequency channels 412 to 638 used by the multi-channel communication technology for performing RF-based sensing. Furthermore, in this embodiment, the multi-channel communication technology uses four frequency channels. In other embodiments, a different number of frequency channels may be used by the multi-channel communication technology for performing RF-based sensing.

Figure 6A:
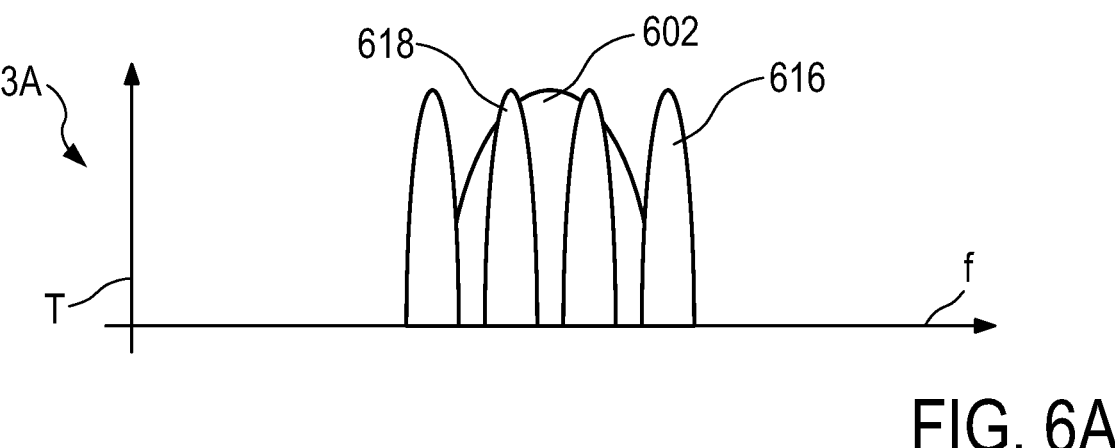
FIG. 6A shows a scenario 3A for selecting frequency channels of the multi-channel communication technology in dependence of the frequency channel of the single-channel communication technology.
Figure 6B:
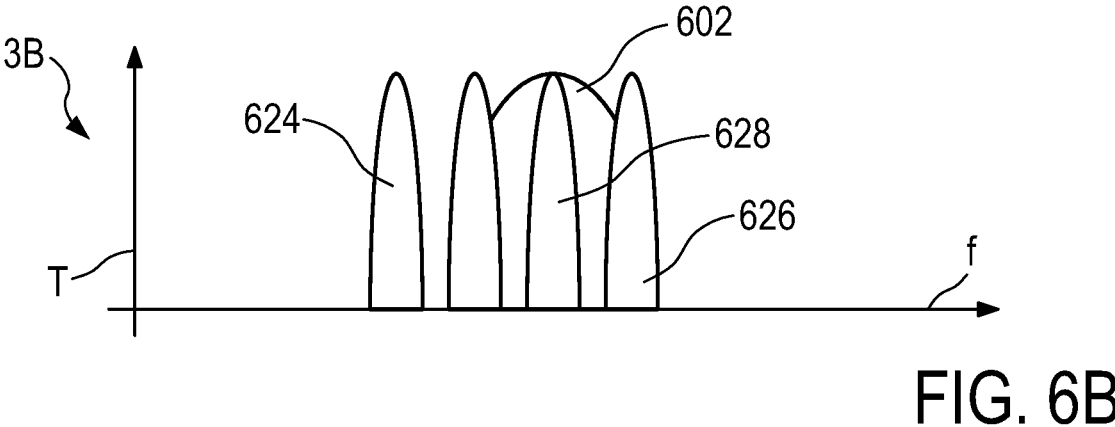
FIG. 6B shows a scenario 3B for selecting frequency channels of the multi-channel communication technology in dependence of the frequency channel of the single-channel communication technology.
Figure 6C:
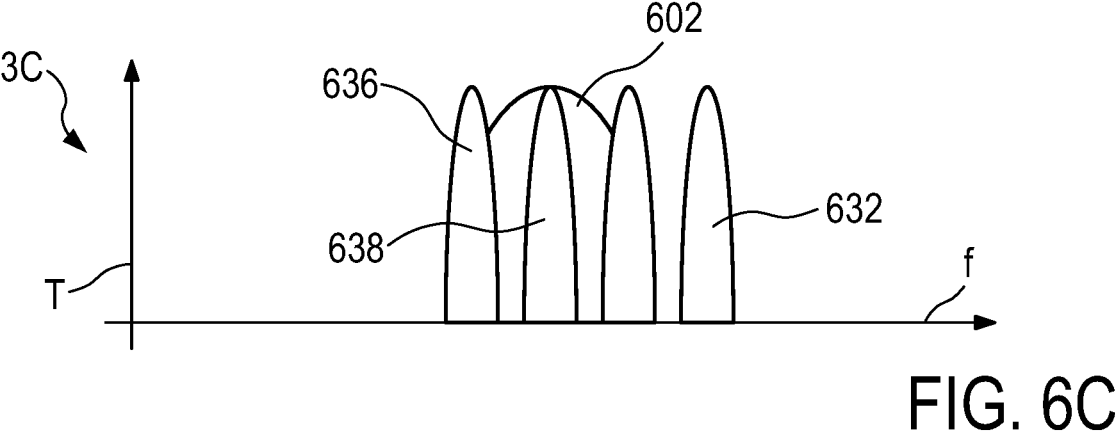
FIG. 6C shows a scenario 3C for selecting frequency channels of the multi-channel communication technology in dependence of the frequency channel of the single-channel communication technology.

The scenarios are grouped in three groups, namely, scenarios 1A to 1C in FIG. 4A to FIG. 4C, scenarios 2A to 2C in FIG. 5A to FIG. 5C, and scenarios 3A to 3C in FIG. 6A to FIG. 6C.

In the first group of the scenarios 1A, 1B, and 1C, the frequency channels 412, 424, 432, and 434 used by the multi-channel communication technology for performing RF-based sensing are selected such that an overlap between a frequency channel 402 used by the single-channel communication technology for performing RF-based sensing with the frequency channels 412, 424, 432, and 434 used by the multi-channel communication technology for performing RF-based sensing is minimized.

In the second group of the scenarios 2A, 2B, and 2C, the frequency channels 512, 516, 518, 524, 526, 528, 532, 534, 536, and 538 used by the multi-channel communication technology for performing RF-based sensing are selected such that at least one frequency channel 516, 518, 526, 528, 536, and 538 used by the multi-channel communication technology for performing RF-based sensing at least partially overlaps with the frequency channel 502 used by the single channel communication technology for performing RF-based sensing.

In the third group of the scenarios 3A, 3B, and 3C, the frequency channels 616, 618, 624, 626, 628, 632, 636, 638 used by the multi-channel communication technology for performing RF-based sensing are selected such that an overlap between a frequency channel 602 used by the single-channel communication technology for performing RF-based sensing with the frequency channels 616, 618, 624, 626, 628, 632, 636, 638 used by the multi-channel communication technology for performing RF-based sensing is maximized.

For many beyond lighting use-cases the RF-based sensing performance of prior art RF-based sensing is inadequate, for instance, if the specific nature of the suspected activity which is to be detected is particularly challenging, or the required confidence level for the detection is high or other contextual parameters must be detected. In these situations, selecting the frequency channels used by the multi-channel communication technology according to the scenarios 1A to 3C for performing RF-based sensing allows an improved RF-based sensing. In particular, starting from the RF-based sensing layer a top-down approach can be used to specifically prescribe to the networking layer through which frequency channel it should hop and for how long to stay on each frequency channel.

In the first group of scenarios, selecting frequency channels through which the multi-channel communication technology should hop ensures that there is as little overlap as possible between the frequency channel used by the single-channel communication technology and those additional frequency channels through which the multi-channel communication technology hops. Minimizing the overlap is especially useful if there is a sensing event that, due to characteristics, affects to some extent all frequency channels through which the hopping can take place. The minimum overlap between the frequency channels therefore may increase a confidence level for classifying the sensing event as both sets of frequency channels being too close to each other would reach similar conclusions on what has happened. This may be helpful, for example, for sensing events that happen in short time frames, such as determining whether a person is falling. Using frequency channels by the multi-channel communication technology for performing RF-based sensing which are very close in frequency or overlapping with the frequency channel used by the single-channel communication technology used for coarsely detecting the sensing event may only yield limited additional information.

FIG. 4A to 4C show exemplarily how frequency channels 412, 424, 432, and 434 used by the multi-channel communication technology for performing RF-based sensing may be selected in order to minimize the overlap with the frequency channel 402 used by the single-channel communication technology for performing RF-based sensing.

Scenarios 1A and 1B show how the frequency channels 412 and 424 used by the multi-channel communication technology can be selected to be at a higher or lower center frequency than that of the frequency channel used by the single-channel communication technology for performing RF-based sensing. Scenario 1C further indicates that the frequency channels 432, and 434 do not need to be equally spaced with respect to each other and also do not need to be on a single side with respect to the frequency channel 402.

FIG. 5A to FIG. 5C show exemplarily, how frequency channels 512, 516, 518, 524, 526, 528, 532, 534, 536, and 538 used by the multi-channel communication technology for performing RF-based sensing may be selected in order to ensure that there is a selectable partial-overlap between the frequency channel 502 used by the single-channel communication technology for performing RF-based sensing and at least some of the frequency channels 512, 516, 518, 524, 526, 528, 532, 534, 536, and 538. In the scenarios 2A, 2B, and 2C, some frequency channels 518, 528, and 538 totally overlap with the frequency channel 502, while other frequency channels 516, 526, and 536 partially overlap. Yet, the frequency channels 512, 524, as well as 532 and 534 do not overlap with the frequency channel 502 at all. Using some frequency channels which overlap and some which do not overlap, may be useful. In particular, as the detection of the sensing event by performing RF-based sensing by the multi-channel communication technology may on one hand share some characteristics with the RF-based sensing by the single-channel communication technology, which allows confirming the sensing event and on the other hand additional insights may be obtained due to additionally also performing RF-based sensing in non-overlapping frequency channels. Similarly as for the first group of scenarios, the frequency channels 516, 526, and 536 may in this case partially overlap towards the higher or lower boundaries of the frequency bandwidth of the frequency channel 502. The non overlapping frequency channels 512, 524, 532, and 534 may have higher or lower center frequencies and may be equally distanced. The frequency channels used by the multi-channel communication technology for performing RF-based sensing may be arranged symmetrically around the center frequency of the frequency channel used by the single-channel communication technology for performing RF-based sensing or they can also be arranged in non-symmetric ways.

FIG. 6A to 6C show exemplarily how frequency channels 616, 618, 624, 626, 628, 632, 636, and 638 used by the multi-channel communication technology for performing RF-based sensing may be selected in order to maximize the overlap with the frequency channel 602 used by the single-channel communication technology for performing RF-based sensing. In other words, the orchestration of frequency channels 616, 618, 624, 626, 628, 632, 636, and 638 used by the multi-channel communication technology for performing RF-based sensing may ensure that there is as much overlap as possible between the frequency channels 616, 618, 624, 626, 628, 632, 636, and 638 used by the multi-channel communication technology for performing RF-based sensing and the frequency channel 602 used by the single-channel communication technology for performing RF-based sensing. This may be useful if the single-channel communication technology uses a frequency channel with a significantly larger frequency bandwidth than the multi-channel communication technology for performing RF-based sensing and the frequency channels used by the multi-channel communication technology for performing RF-based sensing may be selected to be within and/or adjacent to the frequency channel used by the single-channel communication technology for performing RF-based sensing. This may furthermore allow to identify more accurately whether the sensing event can be detected by performing RF-based sensing by the multi-channel communication technology as well or if it is due to some generic noise present within the frequency channel such as noise caused by another RF-based sensing device in the same network interfering on that same frequency channel or caused by hardware problems of the RF-based sensing devices antenna leading to noise on a certain frequency channel.

Scenario 3A shows how a maximized overlap contains different proportions of the outer frequency channels 616 with respect to the inner frequency channels 618, whereas scenarios 3B and 3C indicate how in some situations the maximized overlap can be achieved only with intentionally leaving some frequency channels 624 and 632 to be not overlapping at all. Scenarios 3B and 3C also may be a byproduct of adhering to the standard for the multi-channel communication technology, hence the actual spacing scheme between adjacent frequency channels may be dictated by the communication protocol used by the multi-channel communication technology. In this situation, the frequency channels that are not overlapping may be used for performing RF-based sensing or the frequency channels may be removed such that just three of the four frequency channels are used. This allows to ensure that only frequency channels used by the multi-channel communication technology for performing RF-based sensing that at least partially overlap with the frequency channel used by the single-channel communication technology for performing RF-based sensing are used for performing RF-based sensing.

The frequency channel hopping scheme used in the multi-channel communication technology, which for example may use BLE as communication protocol may be modified by the end devices, e.g., in case that they include a RF-based sensing device. The hopping scheme is not fixed by the BLE standard, but may be negotiated dynamically between the devices that are interacting with each other. This may, for example, be an interaction between two luminaires, each including a RF-based sensing device. The interaction may also be between a BLE audio or IoT device towards a smartphone or PC. The dynamic negotiation process usually includes agreeing on a starting frequency channel and a hopping range or distance, such as skipping ¾ channels, etc. The starting frequency channel, the hopping range, and eventually also a repeatability of the pattern may be modified at the BLE stack level to ensure that there is enough flexibility for applying the mechanisms described above.

Figure 7:
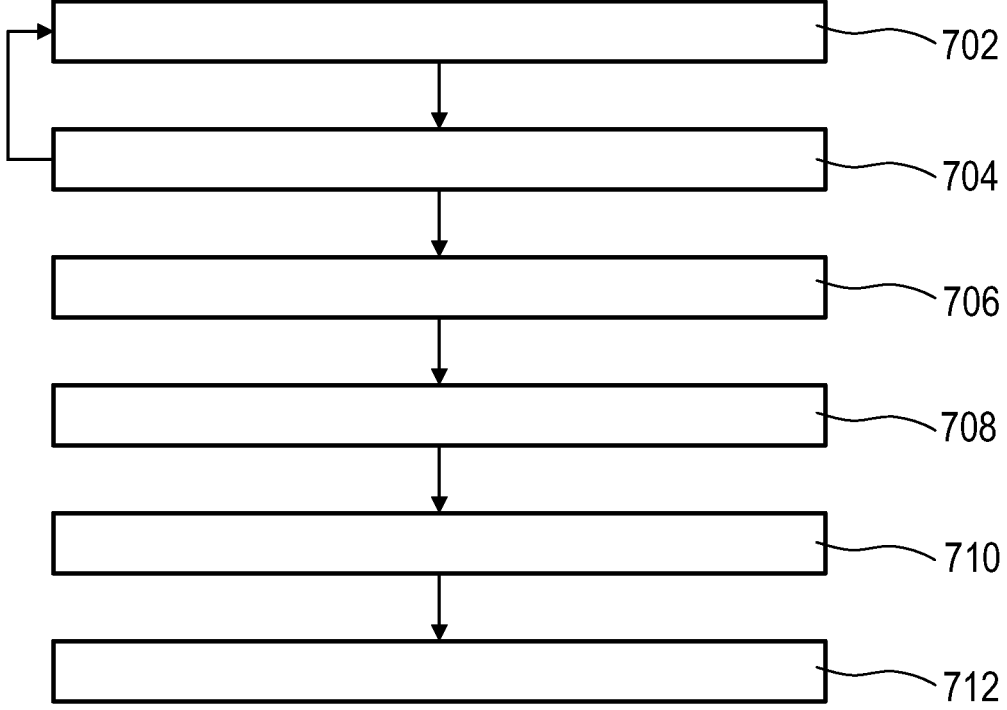
FIG. 7 shows an embodiment of a method for performing RF-based sensing.

FIG. 7 shows an embodiment of the method for performing RF-based sensing. The method can be performed, for example, by the RF-based sensing device 10 presented in FIG. 1 and the connected system 100 presented in FIGS. 2 and 3 in order to improve RF-based sensing.

In step 702, RF-based sensing is performed by a single-channel communication technology in order to detect a sensing event. The RF-based sensing is performed by the single-channel communication technology in dependence of a setting of communication technology parameters of the single-channel communication technology that is optimized for detecting a specific sensing event. The specific sensing event to be detected in this embodiment is to detect an occupancy of a specific volume, i.e., whether the volume is occupied by a person or not. In other embodiments, other sensing events, such as proximity detection or any other sensing event may be detected using RF-based sensing.

In this embodiment, the single-channel communication technology uses one frequency channel with a predetermined frequency bandwidth optimized for occupancy detection. In other embodiments, different settings of the single-channel communication technology may be used with a predetermined frequency bandwidth which may not need to be optimized for a respective sensing event. In this embodiment, Zigbee is used as communication protocol of the single-channel communication technology. Furthermore, transmit power or beam form or beam direction of the single-channel communication technology for performing RF-based sensing may be adjusted in order to optimize detection of the sensing event. In other embodiments, the setting of communication technology parameters of the single-channel communication technology may be optimized for performing motion detection. For example, using a Zigbee communication protocol, transmit power of +10 dBm may be used with a message sending interval of 200 ms. The frequency channel may be within the 2.4 GHz band. Alternatively, for example, WiFi communication protocol may be used with a rate of 30 Hz, i.e., about 33 ms between messages as WiFi allows higher traffic. The frequency channel may also be within the 2.4 GHz band. For breathing detection, the 5 GHz band may be used as the 2.4 GHz band may not yield sufficient data. Fall detection may be performed in the 5 GHz band with a higher sampling rate, such as 1500 Hz.

With the setting of the communication technology parameters optimized for the specific sensing event, RF signals are transmitted into the specific volume. Disturbed and reflected RF signals are received and analysed in order to determine whether a specific sensing event occurred.

In step 704, it is determined whether the sensing event is detected or not. If the sensing event is detected, i.e., upon detection of the sensing event, step 706 is performed, else step 702 is continued.

In step 706, a multi-channel communication technology is selected in dependence of the single-channel communication technology used for detecting the sensing event. In other embodiments, the multi-channel communication technology may be selected additionally in dependence of a detection result, e.g., a confidence level, obtained by performing RF-based sensing by the single-channel communication technology.

In this embodiment, the multi-channel communication technology uses, for example, BLE as communication protocol. In other embodiments, the multi-channel communication technology may also use a different communication protocol, such as a cellular radio communication protocol, e.g., 5G.

In this embodiment the multi-channel communication technology is selected such that the RF-based sensing is performed based on a coordinated frequency hopping between multiple frequency channels of the multi-channel communication technology. The coordinated frequency hopping depends on the single-channel communication technology used for detecting the sensing event.

Therefore, in this embodiment one or more frequency channels and a duration or durations for using each of the one or more frequency channels used by the multi-channel communication technology for performing RF-based sensing are selected in dependence of the single-channel communication technology used for detecting the sensing event. In other embodiments, also only the frequency channels or their durations may be selected in dependence of the single-channel communication technology. The frequency channels or their durations may also be selected based on standard or commonly used values of the communication protocols if one or the other is not selected in dependence of the single-channel communication technology.

The one or more frequency channels used by the multi-channel communication technology for performing RF-based sensing may be selected, for example, as presented in the nine different scenarios shown in FIGS. 4, 5 and 6.

For example, the one or more frequency channels used by the multi-channel communication technology for performing RF-based sensing may be selected such that an overlap between the frequency channel used by the single-channel communication technology for performing RF-based sensing and the frequency channels used by the multi-channel communication technology for performing RF-based sensing is minimized.

Alternatively, the one or more frequency channels used by the multi-channel communication technology for performing RF-based sensing may be selected such that at least one of the frequency channels used by the multi-channel communication technology for performing RF-based sensing overlaps at least partially with the frequency channel used by the single-channel communication technology for performing RF-based sensing.

Yet alternatively, the one or more frequency channels used by the multi-channel communication technology for performing RF-based sensing may be selected such that an overlap between the frequency channel used by the single-channel communication technology for performing RF-based sensing and the frequency channels used by the multi-channel communication technology for performing RF-based sensing is maximized.

The scenario that is selected for selecting the one or more frequency channels of the multi-channel communication technology depends on the specific sensing event that is to be detected as well as whether the sensing event is meant to be verified or whether a higher accuracy of the sensing event is desired.

Additionally, a frequency hopping sequence for the frequency channels, a duration for performing RF-based sensing in a certain one of the frequency channels, and/or a repetition order of the frequency channels used by the multi-channel communication technology for performing RF-based sensing can be provided in dependence of the single-channel communication technology for performing RF-based sensing.

In step 708, RF-based sensing is performed based on the multi-channel communication technology. In this embodiment, RF-based sensing is performed using both multi-channel communication technology and single-channel communication technology in parallel. In other embodiments, the multi-channel communication technology and the single-channel communication technology may be used only subsequently, i.e., whenever one of the communication technologies is used, the other one will not be used.

In this embodiment, additionally, transmit power for performing RF-based sensing of both the single-channel communication technology and the multi-channel communication technology is adjusted in order to optimize the RF-based sensing. As both communication technologies are used in parallel in this embodiment, coordinating their transmit powers may allow improving RF-based sensing. Furthermore, adjusting the transmit power of each of them may allow improve RF-based sensing, e.g., as certain frequency channels may benefit from increased transmit power, while other frequency channels may only need a reduced transmit power or none at all, i.e., corresponding to removing a frequency channel.

In other embodiments, also only the transmit power for performing RF-based sensing of the single-channel communication technology or only the transmit power for performing RF-based sensing of the multi-channel communication technology may be adjusted.

In yet other embodiments, alternatively, or additionally, beam form and/or beam direction of the single-channel communication technology and/or the multi-channel communication technology for performing RF-based sensing may be adjusted.

In step 710, data obtained by performing RF-based sensing based on the multi-channel communication technology is combined with data obtained by performing RF-based sensing by the single-channel communication technology in order to improve the RF-based sensing. The combination of the data obtained by both communication technologies allows to improve the accuracy of the RF-based sensing or at least verify the detected sensing event detected by the single-channel communication technology.

In step 712, data is exchanged based on the multi-channel communication technology. The data can be exchanged between different RF-based sensing devices, e.g., of the connected system. Step 712 is only optionally performed, for example, in order to improve data communication.

Performing steps 702 to 710 of the method allows to provide an improved RF-based sensing. Step 712 allows to improve data communication.

While the invention has been illustrated and described in detail in the drawings and foregoing description, such illus- tration and description are to be considered illustrative or exemplary and not restrictive; the invention is not limited to the disclosed embodiments. For example, it is possible to operate the invention in an embodiment wherein the con- nected system is a heating ventilation air conditioning (HVAC) system or any other type of connected system, particularly home automation system. In this case, RF-based sensing devices may include a HVAC room controller, a HVAC sensor, such as a HVAC passive infrared (PIR) sensor, a wireless receptacle, and a HVAC damper. The communication technologies used for performing RF-based sensing may include, for example, Zigbee, BLE, WiFi, or any other communication technology.

Other variations to the disclosed embodiments can be understood and effected by those skilled in the art in practicing the claimed invention, from a study of the draw- ings, the disclosure, and the appended claims.

In the claims, the word "comprising" and "including" does not exclude other elements or steps, and the indefinite article "a" or "an" does not exclude a plurality.

A single unit, processor, or device may fulfill the func- tions of several items recited in the claims. The mere fact that certain measures are recited in mutually different depen- dent claims does not indicate that a combination of these measures cannot be used to advantage.

Operations like performing RF-based sensing by a single- channel communication technology in order to detect a sensing event, selecting a multi-channel communication technology in dependence of the single-channel communi- cation technology used for detecting the sensing event, performing RF-based sensing based on the multi-channel communication technology, et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope. The present invention relates to performing radio frequency (RF)-based sensing. RF-based sensing is performed by a single-channel communication technology in order to detect a sensing event. Upon detect- ing the sensing event, a multi-channel communication tech- nology is selected in dependence of the single-channel communication technology used for detecting the sensing event. RF-based sensing is then performed based on the multi-channel communication technology. This allows to first perform a coarse detection of a sensing event using the single-channel communication technology and orchestrate a subsequent RF-based sensing using the multi-channel com- munication technology in order to improve accuracy of the RF-based sensing. The frequency channels used by the multi-channel communication technology can be selected in dependence of the frequency channel used by the single- channel communication technology in order to improve the RF-based sensing, e.g., by maximizing or minimizing an overlap between the frequency channels.

The invention claimed is:

1. A radio frequency based sensing device configured for performing radio frequency based sensing by a single- channel communication technology in order to detect a sensing event, comprising:

a controller, the controller being configured upon detect- ing the sensing event:

to select a multi-channel communication technology in dependence of the single-channel communication technology used for detecting the sensing event and such that the radio frequency based sensing is per- formed based on a coordinated frequency hopping between multiple frequency channels of the multi- channel communication technology, the coordinated frequency hopping depending on the single-channel communication technology used for detecting the sensing event, and to perform radio frequency based sensing based on the multi-channel communication technology;

wherein the radio frequency based sensing device is configured, in dependence of the single-channel com- munication technology used for detecting the sensing event, for:

selecting one or more frequency channels used by the multi-channel communication technology for per- forming radio frequency based sensing, selecting a duration or durations for using each of the one or more frequency channels used by the multi- channel communication technology for performing radio frequency based sensing, or selecting both the one or more frequency channels used by the multi-channel communication technology for performing radio frequency based sensing and the duration or the durations for using each of the one or more frequency channels used by the multi-channel communication technology for performing radio fre- quency based sensing; and wherein the sensing event is indicative of a presence of a user.

2. The radio frequency based sensing device according to claim 1, wherein the radio frequency based sensing device is configured for combining data obtained by performing radio frequency based sensing based on the multi-channel communication technology with data obtained by perform- ing radio frequency based sensing by the single-channel communication technology in order to improve the radio frequency based sensing.

3. The radio frequency based sensing device according to claim 1, wherein the radio frequency based sensing device is configured for performing the radio frequency based sensing by the single-channel communication technology in dependence of a setting of communication technology parameters of the single-channel communication technology that is optimized for detecting the sensing event.

4. The radio frequency based sensing device according to claim 3, wherein the radio frequency based sensing device is configured for determining a multi-channel communica- tion technology that optimizes radio frequency based sens- ing in dependence of the setting of the communication technology parameters of the single-channel communication technology and for selecting the multi-channel communica- tion technology that optimizes radio frequency based sens- ing as the multi-channel communication technology for performing the radio frequency based sensing.

5. The radio frequency based sensing device according to claim 1, wherein the radio frequency based sensing device is configured for at least one of:

minimizing an overlap between a frequency channel used by the single-channel communication technology for performing radio frequency based sensing and the frequency channels used by the multi-channel communication technology for performing radio frequency based sensing, selecting the frequency channels used by the multi-channel communication technology for performing radio frequency based sensing such that at least one of the frequency channels used by the multi-channel communication technology for performing radio frequency based sensing overlaps at least partially with the frequency channel used by the single-channel communication technology for performing radio frequency based sensing, and maximizing an overlap between the frequency channel used by the single-channel communication technology for performing radio frequency based sensing and the frequency channels used by the multi-channel communication technology for performing radio frequency based sensing, when selecting the multi-channel communication technology in dependence of the single-channel communication technology used for detecting the sensing event.

6. The radio frequency based sensing device according to claim 1, wherein the radio frequency based sensing device is configured for exchanging data based on the multi-channel communication technology.

7. The radio frequency based sensing device according to claim 1, wherein the radio frequency based sensing device is configured for:

adjusting transmit power or beam form or beam direction of the single-channel communication technology for performing radio frequency based sensing, adjusting transmit power or beam form or beam direction of the multi-channel communication technology for performing radio frequency based sensing, or adjusting transmit power or beam form or beam direction of both the single-channel communication technology and the multi-channel communication technology for performing radio frequency based sensing.

8. The radio frequency based sensing device according to claim 1, wherein the radio frequency based sensing device is configured for providing at least one of: (i) a frequency hopping sequence for frequency channels used by the multi-channel communication technology for performing radio frequency based sensing, (ii) a duration for performing radio frequency based sensing in a certain one of the frequency channels used by the multi-channel communication technology for performing radio frequency based sensing, or (iii) a repetition order of the frequency channels, in dependence of the single-channel communication technology for performing radio frequency based sensing.

9. A connected system for performing radio frequency based sensing including at least two radio frequency based sensing devices according to claim 1.

10. The connected system according to claim 9, wherein at least one of the radio frequency based sensing devices is configured for performing radio frequency based sensing by the single-channel communication technology and wherein the connected system is configured upon detection of a sensing event by the single-channel communication technology to perform radio frequency based sensing based on the multi-channel communication technology on at least one of the radio frequency based sensing devices.

11. A method for performing radio frequency based sensing, comprising:

performing radio frequency based sensing by a single-channel communication technology in order to detect a sensing event, the sensing event being indicative of a presence of a user;

upon detection of the sensing event and in dependence of the single-channel communication technology used for detecting the sensing event: (i) selecting a multi-channel communication technology in dependence of the single-channel communication technology used for detecting the sensing event and such that the radio frequency based sensing is performed based on a coordinated frequency hopping between multiple frequency channels of the multi-channel communication technology, the coordinated frequency hopping depending on the single-channel communication technology used for detecting the sensing event, and (ii) performing radio frequency based sensing based on the multi-channel communication technology; and selecting one or more frequency channels used by the multi-channel communication technology for performing radio frequency based sensing, or selecting a duration or durations for using each of the one or more frequency channels used by the multi-channel communication technology for performing radio frequency based sensing, or selecting both the one or more frequency channels used by the multi-channel communication technology for performing radio frequency based sensing and the duration or the durations for using each of the one or more frequency channels used by the multi-channel communication technology for performing radio frequency based sensing.

12. The method according to claim 11, wherein the method comprises at least one of the steps:

combining data obtained by performing radio frequency based sensing based on the multi-channel communication technology with data obtained by performing radio frequency based sensing by the single-channel communication technology in order to improve the radio frequency based sensing, selecting the multi-channel communication technology such that the radio frequency based sensing is performed based on a coordinated frequency hopping between multiple frequency channels of the multi-channel communication technology, wherein the coordinated frequency hopping depends on the single-channel communication technology used for detecting the sensing event performing the radio frequency based sensing by the single-channel communication technology in dependence of a setting of communication technology parameters of the single-channel communication technology that is optimized for detecting the sensing event, minimizing an overlap between a frequency channel used by the single-channel communication technology for performing radio frequency based sensing and the frequency channels used by the multi-channel communication technology for performing radio frequency based sensing when selecting the multi-channel communication technology in dependence of the single-channel communication technology used for detecting the sensing event, selecting the frequency channels used by the multi-channel communication technology for performing radio frequency based sensing such that at least one of the frequency channels used by the multi-channel communication technology for performing radio frequency based sensing overlaps at least partially with the frequency channel used by the single-channel communication technology for performing radio frequency based sensing when selecting the multi-channel communication technology in dependence of the single-channel communication technology used for detecting the sensing event, maximizing an overlap between the frequency channel used by the single-channel communication technology for performing radio frequency based sensing and the frequency channels used by the multi-channel communication technology for performing radio frequency based sensing when selecting the multi-channel communication technology in dependence of the single-channel communication technology used for detecting the sensing event, exchanging data based on the multi-channel communication technology, adjusting transmit power or beam form or beam direction of the single-channel communication technology for performing radio frequency based sensing, adjusting transmit power or beam form or beam direction of the multi-channel communication technology for performing radio frequency based sensing, adjusting transmit power or beam form or beam direction of both the single-channel communication technology and the multi-channel communication technology for performing radio frequency based sensing, providing a frequency hopping sequence for frequency channels used by the multi-channel communication technology for performing radio frequency based sensing in dependence of the single-channel communication technology for performing radio frequency based sensing, providing a duration for performing radio frequency based sensing in a certain one of the frequency channels used by the multi-channel communication technology for performing radio frequency based sensing in dependence of the single-channel communication technology for performing radio frequency based sensing, providing a repetition order of the frequency channels in dependence of the single-channel communication technology for performing radio frequency based sensing.

13. A non-transitory computer readable medium comprising computer program code to perform the method according to claim 11, when run on a processor.

14. The radio frequency based sensing device according to claim 1, further comprising:

a transceiver, and at least one antenna.

* * * * *